(12) United States Patent
Teng et al.

(10) Patent No.: US 10,239,039 B2
(45) Date of Patent: Mar. 26, 2019

(54) PREPARATION AND APPLICATION OF CARBON NANOPARTICLE DIODE

(71) Applicant: National Cheng Kung University, Tainan (TW)

(72) Inventors: Hsi-Sheng Teng, Tainan (TW); Te-Fu Yeh, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 296 days.

(21) Appl. No.: 14/494,299

(22) Filed: Sep. 23, 2014

(65) Prior Publication Data
US 2015/0314276 A1 Nov. 5, 2015

(30) Foreign Application Priority Data

May 2, 2014 (TW) .............................. 103115898 A

(51) Int. Cl.
| | | |
|---|---|---|
| *B82Y 30/00* | (2011.01) | |
| *B01J 27/24* | (2006.01) | |
| *B01J 21/18* | (2006.01) | |
| *B01J 27/20* | (2006.01) | |
| *B01J 19/12* | (2006.01) | |
| *B01J 35/00* | (2006.01) | |

(52) U.S. Cl.
CPC ............. *B01J 19/127* (2013.01); *B01J 21/18* (2013.01); *B01J 27/20* (2013.01); *B01J 27/24* (2013.01); *B01J 35/004* (2013.01); *B01J 35/0013* (2013.01); *B01J 2219/12* (2013.01); *B82Y 30/00* (2013.01); *Y10S 977/774* (2013.01); *Y10S 977/902* (2013.01)

(58) Field of Classification Search
CPC .......... B01J 19/127; B01J 35/00; B01J 27/20; B01J 21/02; B01J 27/24; B01J 35/0013; B01J 35/004; B01J 2219/12; B01J 21/18; Y10S 977/902; Y10S 977/774; B82Y 30/00
USPC ......................................... 204/157.52, 157.5
See application file for complete search history.

(56) References Cited

U.S. PATENT DOCUMENTS

| | | | | |
|---|---|---|---|---|
| 4,094,751 A | * | 6/1978 | Nozik | .................... B01J 19/122 |
| | | | | 204/157.52 |
| 2010/0025660 A1 | * | 2/2010 | Jain | ................... H01L 29/66977 |
| | | | | 257/24 |

OTHER PUBLICATIONS

Jia et al, "Highly Durable N-Doped Graphene/CdS Nanocomposites with Enhanced Photocatalytic Hydrogen Evolution from Water under Visible Light Irradiation," J. Phys. Chem. C 2011, vol. 115, pp. 11466-11473.*
Xiao et al, "Layer-by-Layer Self-Assembly of CdS Quantum Dots/ Graphene Nanosheets Hybrid Films for Photoelectrochemical and Photocatalytic Applications," J. Am. Chem. Soc. 2014, vol. 136, pp. 1559-1569.*
Mukherji et al, "Nitrogen Doped Sr2Ta2O7 Coupled with Graphene Sheets as Photocatalysts for Increased Photocatalytic Hydrogen Production," ACS Nano vol. 5 No. 5, pp. 3483-3492, 2011.*

(Continued)

*Primary Examiner* — Nicholas A Smith
*Assistant Examiner* — Colleen M Raphael
(74) *Attorney, Agent, or Firm* — Soroker Agmon Nordman

(57) ABSTRACT

An oxidative method for water is provided. The oxidative method includes providing a compound having properties of a p-type semiconductor and an n-type semiconductor; obtaining a mixture by adding the compound to the water; and illuminating the mixture using a light source to excite the compound.

8 Claims, 24 Drawing Sheets

(56) References Cited

OTHER PUBLICATIONS

Pei et al, "Nanocomposite of graphene oxide with nitrogen doped TiO2 exhibiting enhanced photocatalytic efficiency for hydrogen evolution," International Journal of Hydrogen Energy 38 (2013) pp. 2670-2677.*

Iwase et al, "Reduced Graphene Oxide as a Solid-State Electron Mediator in Z-Scheme Photocatalytic Water Splitting under Visible Light," J. Am. Chem. Soc. 2011, vol. 133, pp. 11054-11057.*

Yao et al, "High Performance Photocatalysts Based on N-doped Graphene-P25 for Photocatalytic Reduction of Carbon Tetrachloride," J. Inorg. Organomet. Polym. (2014) 24:315-320.*

Lavorato et al, "N-Doped Graphene Derived from Biomass as a Visible-Light Photocatalyst for Hydrogen Generation from Water/Methanol Mixtures," Chem. Eur. J. 2014, vol. 20, pp. 187-194.*

He et al, "Enhanced Visible Activities of α-Fe2O3 by Coupling N-Doped Graphene and Mechanism Insight," ACS Catal. 2014, vol. 4, pp. 990-998.*

"Nitrogen-Doped Graphene Oxide Quantum Dots as Photocatalysis for Overall Water-Splitting under Visible Light Illumination" Te-Fu Yeh, et al.; Feb. 22, 2014 Advanced Materials. (Main Text and Supporting Information).

"Graphene oxide quantum Photocatalysts for Water Splitting and its upconverted photoluminescence." Te-Fu Yeh and Hsisheng Teng; Nov. 6, 2013 Annual Meetings.

\* cited by examiner

Zone I

Zone II

PREPARATION AND APPLICATION OF CARBON NANOPARTICLE DIODE

CROSS-REFERENCE TO RELATED APPLICATION AND CLAIM OF PRIORITY

The application claims the benefit of Taiwan Patent Application No. 103115898, filed on May 2, 2014, in the Taiwan Intellectual Property Office, the disclosures of which are incorporated herein in their entirety by reference.

FIELD OF THE INVENTION

The present invention relates to a method for manufacturing a carbon nanoparticle diode. In particular, the present invention relates to a method for manufacturing a doped graphene oxide.

BACKGROUND OF THE INVENTION

Graphene oxide nanoplatelets can change the pore size and pore structure of a porous medium formed by phase inversion. The graphene oxide membrane has anti-biofouling capability due to its hydrophilicity and electrostatic repulsion characteristics. It also has superior mechanical strength and water permeability.

A commercial process for photocatalytic water splitting to produce hydrogen applies a two-photocatalyst system. The two-photocatalyst system is comprised of an $H_2$-catalyst and an $O_2$-catalyst to produce hydrogen gas and oxygen gas, respectively. The safety issue of an $H_2$—$O_2$ explosion must be considered in the commercial process. Conventionally in the Z-scheme, two catalysts are mixed in one reactor to perform photocatalytic water splitting, and thus hydrogen and oxygen are produced as a mixture. Two compartments of the twin reactor are separated by an ion-exchange membrane. Thus, a reverse reaction occurs which reduces the efficiency of water splitting. Under visible-light irradiation, hydrogen and oxygen can be separately generated.

Photocatalytic water-splitting into hydrogen gas ($H_2$) and oxygen gas ($O_2$) using sunlight has attracted considerable attention as a renewable energy resource. For large-scale hydrogen fuel production, powdered photocatalytic water-splitting, which has a large area for catalyst-water contact and an uncomplicated reactor design, is advantageous over photoelectrochemical systems. To make powdered photocatalytic water-splitting sustainable, a visible-light sensitive material capable of splitting water into $H_2$ and $O_2$ is critical. Numerous studies have reported metal-containing photocatalysts with high activity for $H_2$ or $O_2$ generation from water decomposition under visible-light irradiation, but most only executed water-splitting half-reactions with sacrificial reagents. Domen et al. developed $Rh_{2-y}Cr_yO_3$GaN:ZnO compounds, which contain noble metals and are so far the most active catalysts for overall water-splitting under visible light irradiation (*J. Am. Chem. Soc.* 2012, 134, 8254). An alternative approach for cost-effective hydrogen production is the development of photocatalysts from carbon materials, which are abundant and environmentally friendly.

Graphitic carbon nitride and graphene oxide are capable of decomposing water for $H_2$ generation if sacrificial reagents are added under irradiation. Electronic structural analysis revealed that graphene oxide materials have conduction band minimum (CBM) and valence band maximum (VBM) levels suitable for generating hydrogen gas ($H_2$) and oxygen gas ($O_2$), respectively, under visible-light irradiation.

SUMMARY OF THE INVENTION

In accordance with an aspect of the present invention, an oxidative method comprises providing a compound having properties of a p-type semiconductor and an n-type semiconductor, obtaining a mixture by adding the compound to the water, and illuminating the mixture using a light source to excite the compound.

Preferably, the compound has a quantum dot selected from a group consisting of a doped graphene oxide-quantum dots, a graphene oxide-quantum dots (GO-QDs) and a combination thereof.

Preferably, the doped graphene oxide-quantum dot has at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—), and a combination thereof.

Preferably, the light source has an excitation wavelength ranging from 200 nm to 900 nm.

In accordance with another aspect of the present invention, a photocatalytic splitting method comprises providing a compound having properties of a p-type semiconductor and an n-type semiconductor, obtaining a mixture by adding the compound to the water; and illuminating the mixture using a light source to excite the compound.

Preferably, the method generates $H_2$ or $O_2$ from water.

In accordance with a further aspect of the present invention, a luminescent composite comprises a compound having properties of a p-type semiconductor and an n-type semiconductor.

Preferably the compound has a quantum dot selected from a group consisting of a doped graphene oxide-quantum dot, a graphene oxide-quantum dot and a combination thereof.

Preferably the doped graphene oxide-quantum dot has a particle size ranging from 6 nm to 10 nm, and a height ranging from 1 nm to 3 nm.

The above objectives and advantages of the present invention will become more readily apparent to those ordinarily skilled in the art after reviewing the following detailed descriptions and accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1A shows the Full-range XPS spectrum of NGO-QDs;

FIG. 1B shows the C 1s XPS spectrum of NGO-QDs; and

FIG. 1C shows the N 1s XPS spectrum of NGO-QDs;

FIG. 2A shows the TEM image of NGO-QDs; and

FIG. 2B shows the wide-range TEM image of NGO-QDs.

FIG. 3A shows the high-resolution TEM image of NGO-QDs, illustrating the graphene {1 T00}lattice planes with a d-spacing of 0.213 nm and showing two specified zones; and FIG. 3B shows the high-resolution TEM image of FIG. 3A FIGS. 4A-4C show the magnified Zones of the TEM image

FIG. 5A shows the AFM image distributed on a mica substrate; and

FIG. 5B shows the height profile along the line in panel A.

FIGS. 6 A-6B show the thickness analysis of NGO-QDs layers;

FIG. 6B shows the EELS spectrum acquired over the area in panel a.

FIG. 8A shows the optical absorption spectrum of NGO-QDs dispersed in water; and FIG. 8B shows the diffuse reflectance spectrum of the NGO-QDs powder.

FIG. 10A shows the cathodic scan for determining the conduction band minimum (CBM) at 5 mV s$^{-1}$; and FIG. 10B shows the anodic scan for determining the valence band maximum (VBM) at 5 mV s$^{-1}$; and FIG. 10C shows the variation of capacitance (C) with the applied potential in $H_2SO_4$ presented in the Mott-Schottky relationship for the NGO-QDs electrode.

FIG. 12A shows the time courses of generation of $H_2$ and $O_2$ over 1.2 g of NGO-QDs;

FIG. 12B shows the $H_2$ and $O_2$ generation from pure water;

FIG. 12C shows the $H_2$ generation from an aqueous methanol solution suspended with 0.3 g of NGO-QDs under inner mercury lamp irradiation; and FIG. 12D shows the inner irradiation with UV-blocked mercury lamp.

FIG. 16A shows the generation of $H_2$ over of GO-QDs; and

FIG. 16B shows the generation of $O_2$ over of $NH_3$—NGO-QDs.

DETAILED DESCRIPTION OF THE PREFERRED EMBODIMENT

Figure 1A:
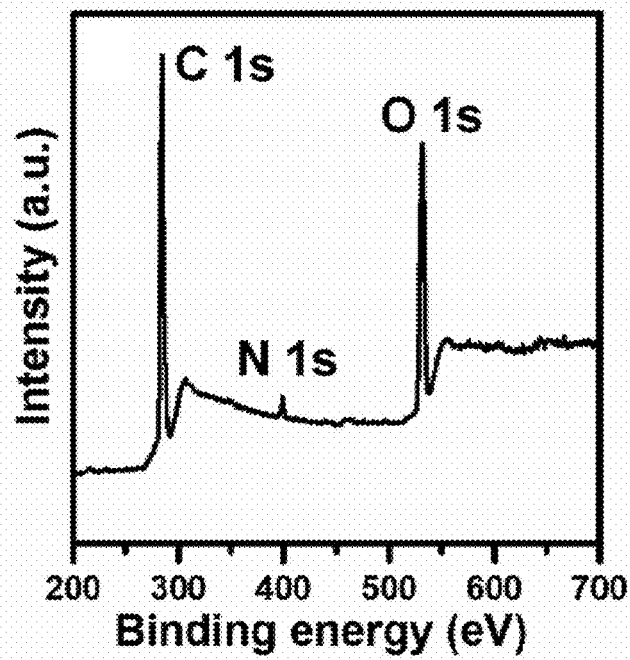
FIGS. 1A-1C show the XPS spectra of NGO-QDs.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In the present invention, a graphite oxide semiconductor photocatalyst is synthesized using a modified Hummers' procedure. Under irradiation with UV or visible light, this graphite oxide photocatalyst steadily catalyzes $H_2$ and $O_2$ generation from water. The encouraging results presented in this study demonstrate the potential of graphitic materials as a medium for photocatalytic activity and an oxidation reaction.

In an embodiment, photocatalytic activity and oxidation occurs under light irradiation through graphene with an apparent bandgap of 0 to 7 eV, more preferably about 0.1 to 6.8 eV, and most preferably about 0.1 to 6 eV.

In a preferred embodiment, the graphene non-metal dopant has at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—), and a combination thereof.

Preferably, in another embodiment, the oxidation method comprises a photocatalytic reaction, a photooxidative reaction, a reversible reaction, and a combination thereof.

Developing a synthesis route that precisely tunes the electronic characteristics of graphene oxide materials is critical for graphene oxide-assisted water-splitting. Graphene oxide is a graphene compound with a basal plane and an edge bearing oxygen functionalities. The VBM and CBM of graphene consist of bonding n and anti-bonding π (that is, π*) orbitals, respectively. A single sheet of graphene with an infinite sp$^2$ domain is a zero band-gap semiconductor because π and π* orbitals touch at the Brillouin zone corners. Size modulation and chemical modification readily tune the electronic properties of graphene. The size effect results from quantum confinement, which becomes prominent when the sp$^2$ domain size is less than 10 nm. Quantum confinement causes the separation of the π and π* orbitals, and creates a band gap in the graphene. Modifying graphene using oxygen adsorption forms C—O covalent bonds that damage the original orbitals and confine it electrons because of the reduction in sp$^2$ domain size. This modification causes the quantized discrete levels to be dictated by the nature of the sp$^2$ domains and associated functional groups. Graphene oxide is a p-doped material because oxygen atoms are more electronegative than carbon atoms. Replacing oxygen functional groups on the graphene oxide sheet edge with nitrogen-containing groups transforms graphene oxide into an n-type semiconductor. In addition to surface modification using addition of functionalities, direct substitution with heteroatoms in the graphene lattice induces the modulation of optical and electronic properties.

Graphene oxide derived from the extensive oxidation of graphite powders exhibits a large accessible surface in an aqueous solution, which makes graphene oxide an effective medium for photocatalytic water-splitting without the presence of noble metal co-catalysts such as Pt or Ru. The p-type conductivity results in the formation of an accumulation layer at the graphene oxide/water interface, which is favorable for water reduction to hydrogen. Nitrogen-containing graphene oxide, which exhibits n-type characteristics, promotes hole transfer for water oxidation to oxygen. Modifying a graphene sheet to exhibit both p-type and n-type conductivities produces a photocatalytic medium effective for overall water-splitting into $H_2$ and $O_2$. In addition, effective exciton, separation and charge transfer are essential factors for water-splitting to occur. Reducing the size of the graphene oxide sheets may lower the recombination probability of the photogenerated charges.

From a design standpoint, some functions were produced by modifying the doped graphene of the present invention with well-know synthesis methods. The approaches can be roughly classified as size modification, chemical modification and surface transfer modification. For instance, N-doped graphene may be formed by chemical vapor deposition of a mixture of $NH_3$ and $CH_4$ gas, or by arc discharge of carbon electrodes in the presence of $H_2$/pyridine or $H_2/NH_3$. If desired, more than one hydrothermal treatment and calcination modification at high temperatures can be used. Preferably, the doping method uses the modified Hummers' method.

The nitrogen-doped graphene oxide-quantum dots (NGO-QDs) were obtained by oxidizing the synthesized nitrogen-doped graphene using the modified Hummers' method, followed by centrifugation to remove larger particles. Multiple washings of the nitrogen-doped graphene oxide-quantum dots were conducted with ethanol, and centrifugation was used to collect the specimens. In addition to nitrogen-doped graphene oxide-quantum dot, nitrogen-free graphene oxide-quantum dots were synthesized in the same manner as that for nitrogen-doped graphene oxide-quantum dot except that the $NH_3$ treatment was replaced with Ar treatment.

In a preferred embodiment, nitrogen-doped graphene was synthesized by treating the prepared graphene oxide in a flow of $NH_3$ gas, or the graphene oxide was added to a solution containing the precursors nitrogen, sulfur, boron and phosphor. During the hydrothermal process, the temperatures were in the range of 100-240° C.

Based on the structural characteristics required for photocatalytic water-splitting, we synthesized nitrogen-doped graphene oxide-quantum dot as the catalyst. The nitrogen-doped graphene oxide-quantum dot exhibited both p-type and n-type conductivities, based on the results of the electrochemical Mott-Schottky analysis.

The prominent photoluminescence emissions indicated that photochemical p-n diodes constituted the nitrogen-doped graphene oxide-quantum dot. The diode configuration resulted in an internal Z-scheme charge transfer for effective reaction at the quantum dot interface. Visible light (>420 nm) irradiation of the nitrogen-doped graphene oxide-quantum dot resulted in simultaneous $H_2$ and $O_2$ generation from pure water at an $H_2:O_2$ molar ratio of 2:1.

Table 1. (O 1s)/(C 1s) and (N 1s)/(C 1s) atomic ratios determined from the full-range X-ray photoelectron spectroscopy (XPS) spectra (FIG. 1A), carbon bonding composition determined from the C 1s XPS (FIG. 1b), and nitrogen bonding composition determined from the N 1s XPS (FIG. 1c) for nitrogen-doped graphene oxide-quantum dot (NGO-QDs).

TABLE 1

| Atomic Ratio | | | | | |
|---|---|---|---|---|---|
| | Carbon Bonding Composition (%) | | | | |
| O1s/C1s | C—C | C—N | C—O | C=O | O—C=O |
| 23% | 71 | 6 | 11 | 4 | 8 |
| | Nitrogen Bonding Composition (%) | | | | |
| N1s/C1s | pyridine | | pyrrolic | | quaternary |
| 2.9% | 28 | | 60 | | 12 |

Figure 1B:
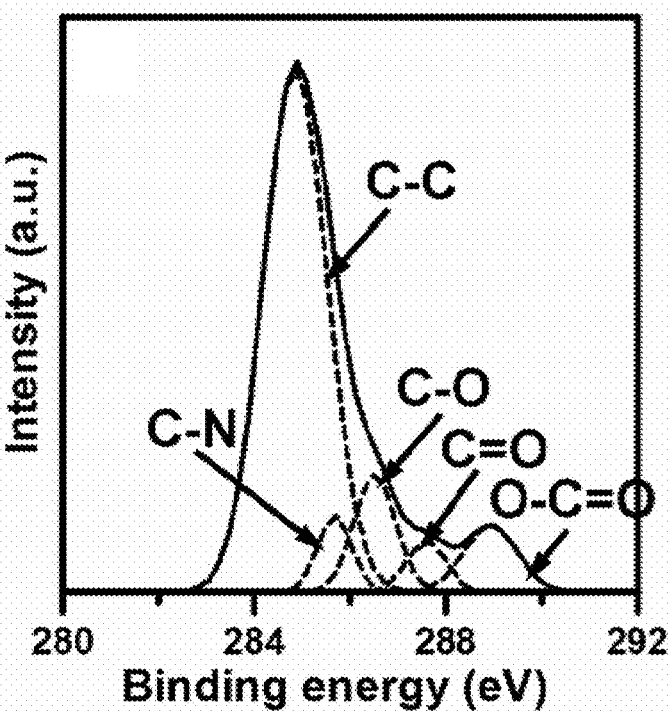
Figure 1C:
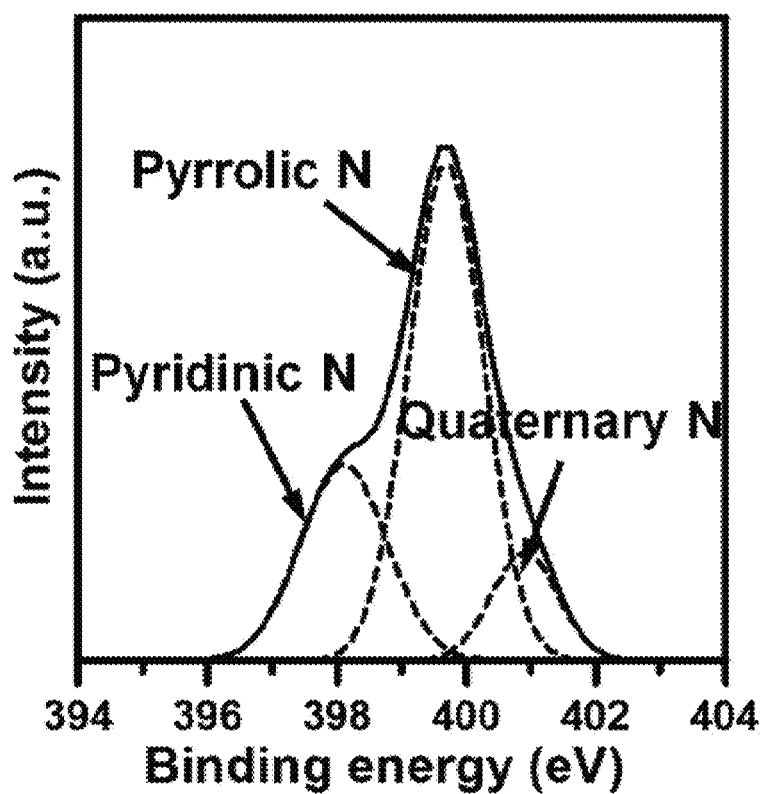

We synthesized nitrogen-doped graphene oxide-quantum dot by treating graphene oxide in $NH_3$ at 500° C., and then subjecting the $NH_3$-treated graphene oxide to oxidation using a modified version of Hummers' method. FIG. 1 shows the XPS spectra of the nitrogen-doped graphene oxide-quantum dot. The full-range nitrogen-doped graphene oxide-quantum dot spectrum (FIG. 1A) shows the binding energy peak of C 1s at 286 eV, N 1s at 400 eV, and O 1s at 532 eV. Quantitative analysis of the XPS spectrum determined that the atomic ratios of (O 1s)/(C 1s) and (N 1s)/(C 1s) were 0.23 and 0.029, respectively (Table 1). The $NH_3$ treatment did introduce nitrogen atoms into the graphene grid, although the concentration of nitrogen was low. FIG. 1B shows the C 1s XPS spectra of the nitrogen-doped graphene oxide-quantum dot, which ranged from 280 to 292 eV. These spectra consisted of peaks at 284.6, 285.6, 286.5, 287.5, and 288.9, attributable to the C—C, C—N, C—O, C=O, and O—C=O groups, respectively. The C—O bond may correspond to epoxy and tertiary alcohol functional groups on the basal plane, as well as phenol in the periphery. The C=O and O—C=O bonds indicate the presence of ketone and carboxylic groups in the graphene periphery. The carbon bonding composition (Table 1) reflects the fact that most of the oxygen functionalities were located on the graphene edge sites of the nitrogen-doped graphene oxide-quantum dot. As for the nitrogen functionalities, the N 1s spectrum, ranging from 394 to 404 eV (FIG. 1C), comprised peaks corresponding to pyridine-like (398.1 eV), pyrrolic-like (399.6 eV), and quaternary (400.9 eV) nitrogen atoms. The high percentages of the pyridine- and pyrrolic-like functionalities (Table 1) indicated that the nitrogen atoms were mainly located on the graphene sheet edge.

Figure 2A:
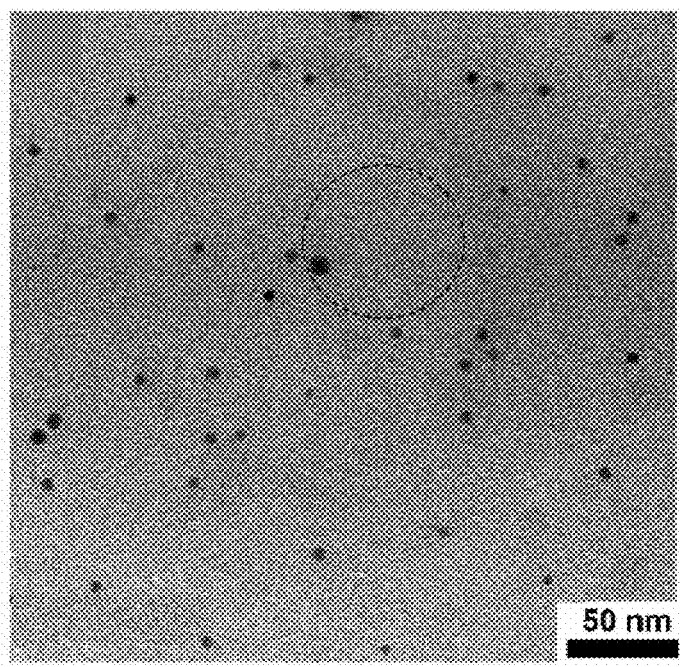
FIGS. 2A-2B show the morphology and crystal structure of NGO-QDs.
Figure 2B:
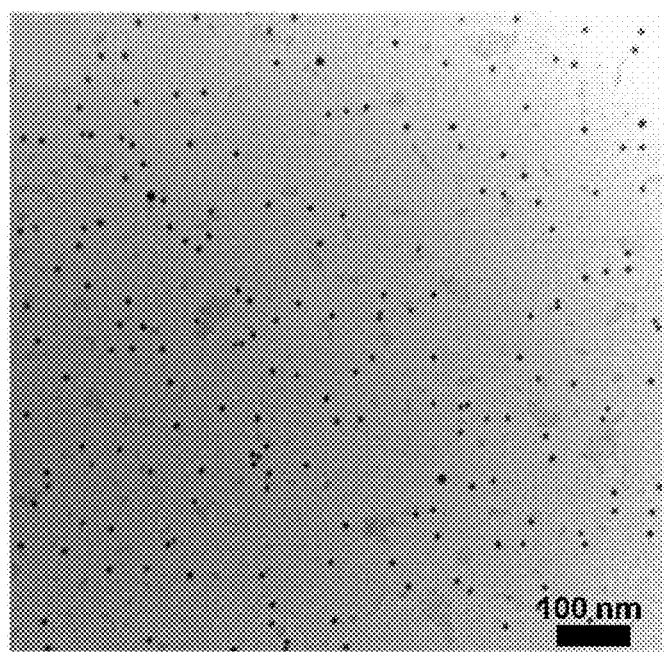
Figure 3A:
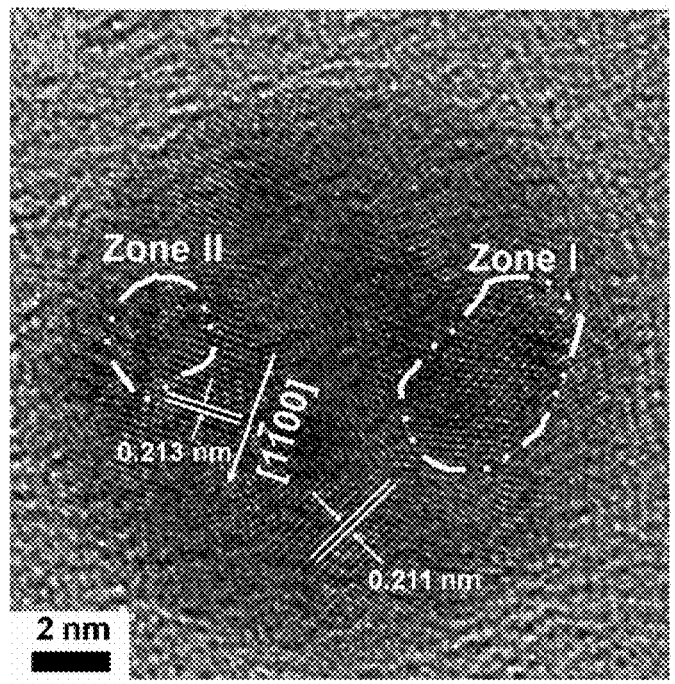
FIGS. 3A-3B show the high-resolution TEM image of NGO-QDs.
Figure 3B:
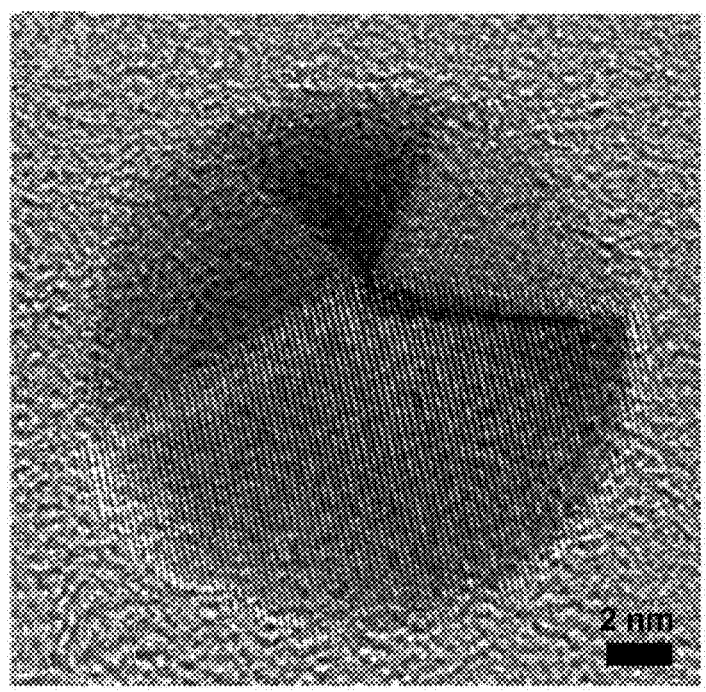
Figure 4A:
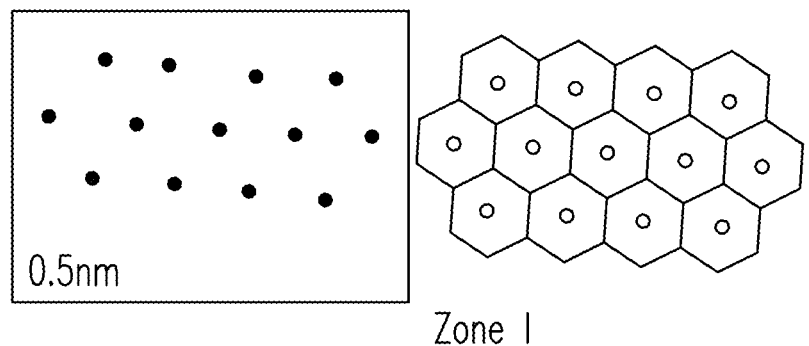
FIG. 4A shows the magnified Zones I of the TEM image in FIG. 3A.
Figure 4B:
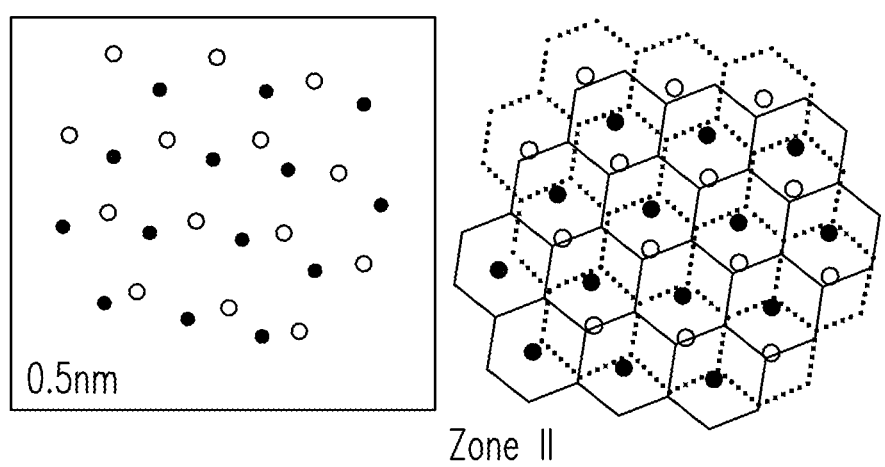
FIG. 4B shows the Magnified Zones II of the TEM image in FIG. 3A.
Figure 4C:
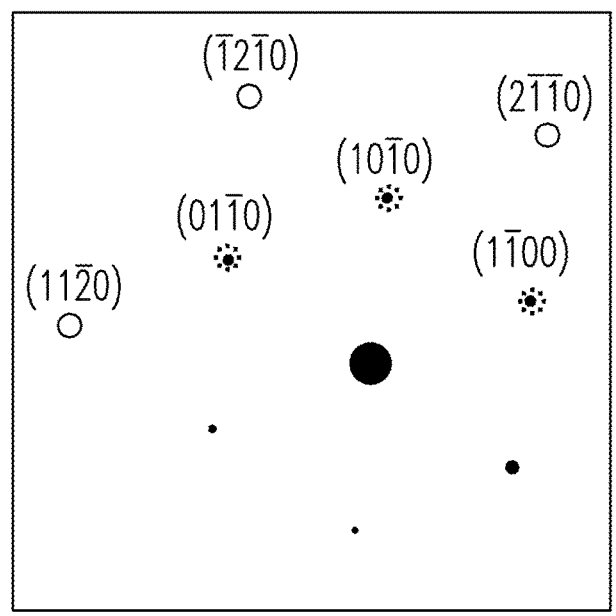
FIG. 4C shows the selected-area electron diffraction pattern of the NGO-QDs in FIG. 3A.

FIG. 2A shows the transmission electron microscopy (TEM) images of the nitrogen-doped graphene oxide-quantum dot, which had a particle size of 8.1±1.8 nmn (mean size±standard deviation) based on the analysis with a wide-range TEM image (FIG. 2B). The high-resolution image (FIG. 3A) shows the circular shape of the nitrogen-doped graphene oxide-quantum dot, with visible crystalline lattice fringes (FIG. 3B). The interlayer spacing of 0.213 nm corresponds to the d-spacing of the graphene {1 $\bar{1}$00}planes. Further magnification revealed that the image in FIG. 3A consisted of zones with different atomic arrangements (Zones I and II). FIG. 4A shows the magnification of Zone I, in which the bright spots correspond to the benzene-ring centers. Zone I depicts a graphene-layer plane formed of carbon atoms ordered in regular benzene hexagons. Each bright spot within the plane is surrounded by six adjacent spots at an equal separation of 0.24 nm. The magnified Zone II in FIG. 4B shows two graphene-layer planes stacked in the graphitic AB order. The right-hand sides of FIG. 4A and FIG. 4B show the schematic graphene structure based on the bright spots on the TEM image. The bright spots correspond to the benzene-ring centers of graphene. Each bright spot is surrounded by three adjacent spots at a separation of 0.14 nm. Although the quantum dot comprised different layering zones, its selected-area electron diffraction pattern, projected perpendicularly to the basal plane of the quantum dot (FIG. 4C), exhibits clear diffraction spots identical to those of graphite along the [0001] direction. The TEM images and diffraction pattern demonstrate that the quantum dots were single-crystalline, and consisted of various sized graphene layers stacked in the AB order.

FIG. 5 shows an atomic force microscopy (AFM) image of the nitrogen-doped graphene oxide-quantum dot on a mica substrate. Their topographic heights were mostly between 1 and 3 nm. This result indicates that the nitrogen-doped graphene oxide-quantum dot primarily consisted of 1-4 layers of graphene sheets.

Figure 5A:
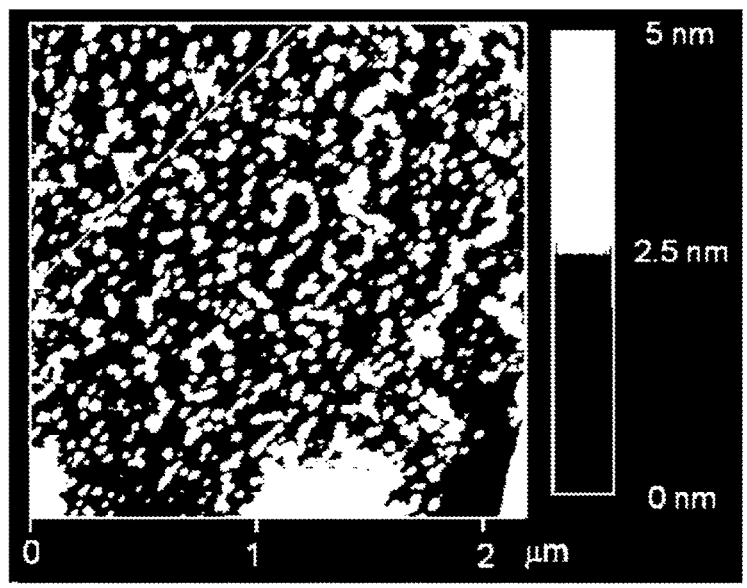
FIGS. 5A-5B show the atomic force microscopy (AFM) image of NGO-QDs.
Figure 5B:
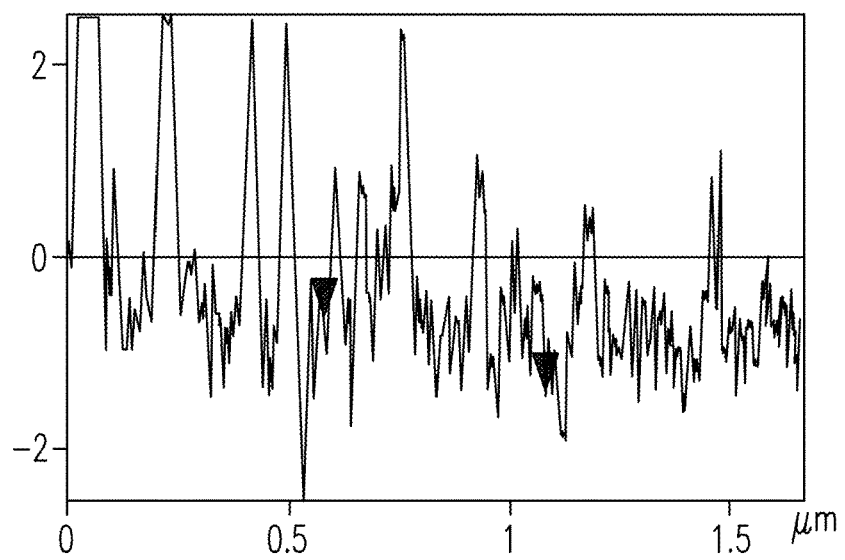

FIG. 5A shows a high concentration of nitrogen-doped graphene oxide-quantum dot deposited on a carbon substrate for analysis. FIG. 5B presents the EELS spectrum acquired over the area indicated in FIG. 5A. We determined the mean thickness of the nitrogen-doped graphene oxide-quantum dot using the follow equation (1):

$$t = \lambda \ln\left(\frac{I_t}{I_0}\right) \quad (1)$$

where t represents the specimen thickness, $\lambda$ is the mean free path of inelastic electron-scattering in the specimen, and $I_0$ and $I_t$ are the intensities of the zero loss peak and total signal of an EELS spectrum, respectively. We treated the nitrogen-doped graphene oxide-quantum dot as amorphous carbon because they were too small to be regarded as graphite crystals. The mean free path of inelastic electron scattering in amorphous carbon is approximately 20 nm at 200 keV. Based on the spectrum in FIG. 5 and carbon substrate thickness (4.4 nm), we used Equation (1) to calculate a mean thickness of 1.8 nm for the nitrogen-doped graphene oxide-quantum dot.

Figure 6A:
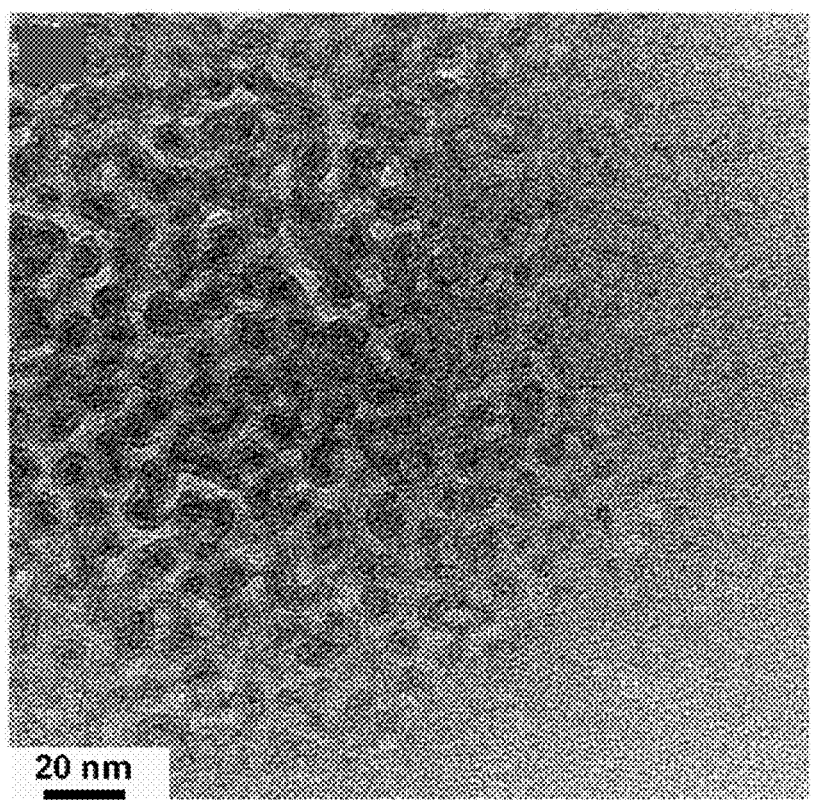
FIG. 6A shows the TEM image of NGO-QDs.
Figure 6B:
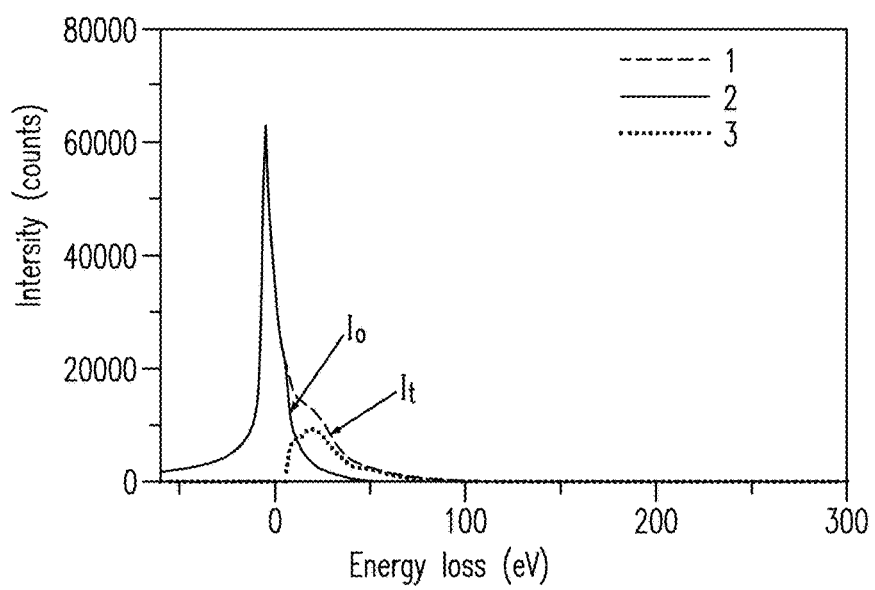

We also used TEM electron energy-loss spectroscopy (EELS) to estimate the thickness of the nitrogen-doped graphene oxide-quantum dot (FIG. 6A) and obtained a mean thickness of 1.8 nm for the nitrogen-doped graphene oxide-quantum dot. The thicknesses of the nitrogen-doped graphene oxide-quantum dot estimated from the EELS and AFM analyses were consistent, suggesting an average number of graphene layers of 2-3.

Figure 7:
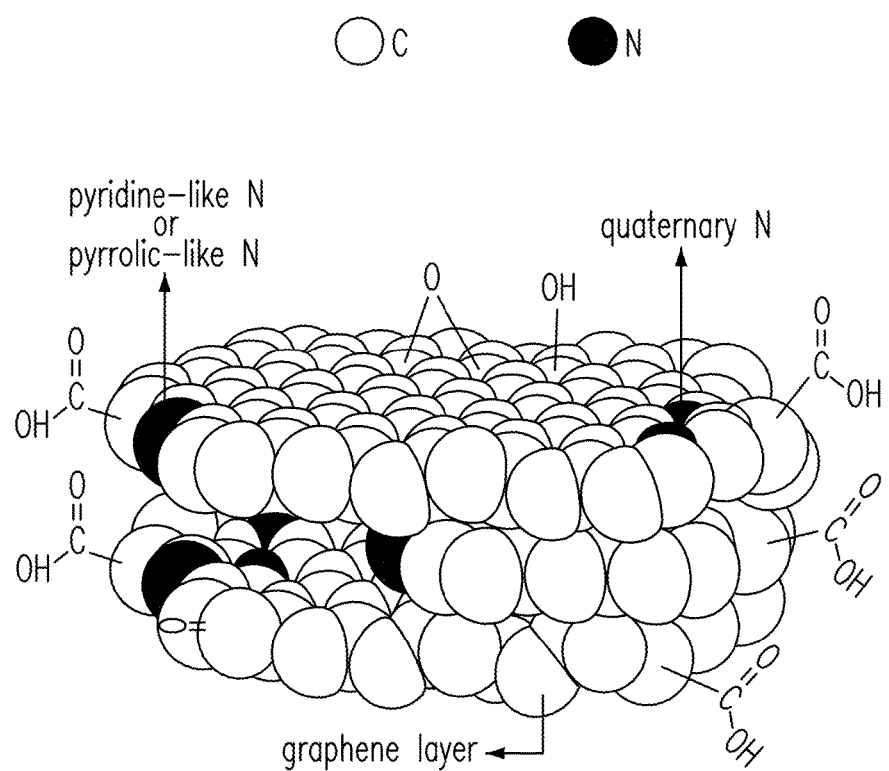
FIG. 7 shows the conceptual schematic of the NGO-QDs structure.

The main body of the nitrogen-doped graphene oxide-quantum dot consists of nitrogen-doped graphene layers stacked in the AB order, bore with oxygen functional groups at outer surface. FIG. 7 displays a schematic of the nitrogen-doped graphene oxide-quantum dot structure, based on the XPS and TEM analyses. The quantum dot consisted of various sized graphene layers stacked in the AB order. The main body of this quantum dot contained nitrogen atoms from the high-temperature treatment with $NH_3$, and the basal and peripheral planes were bore with oxygen functionalities from the subsequent oxidation. This sequential introduction of nitrogen followed by oxygen respectively provides n-type and p-type conductivities to the graphene quantum dot. The electronic properties of the nitrogen-doped graphene oxide-quantum dot will be discussed later.

Figure 8A:
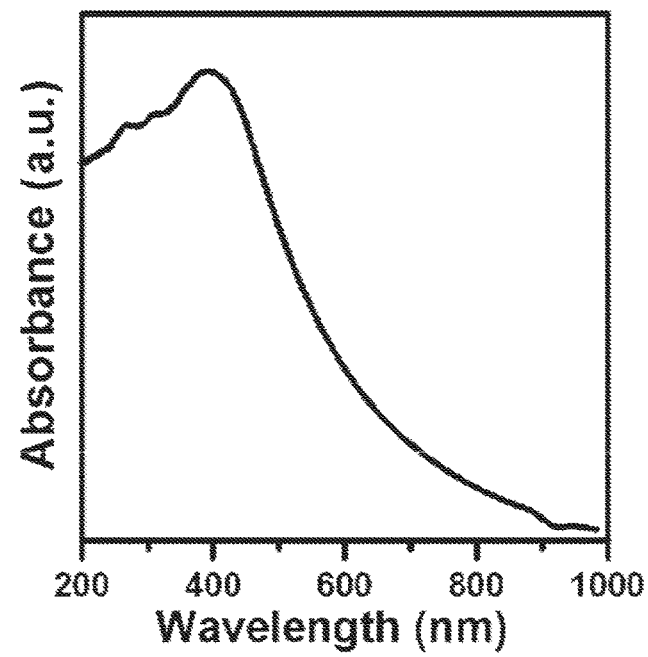
FIGS. 8A-8B show the spectrum of the NGO-QDs powder.
Figure 8B:
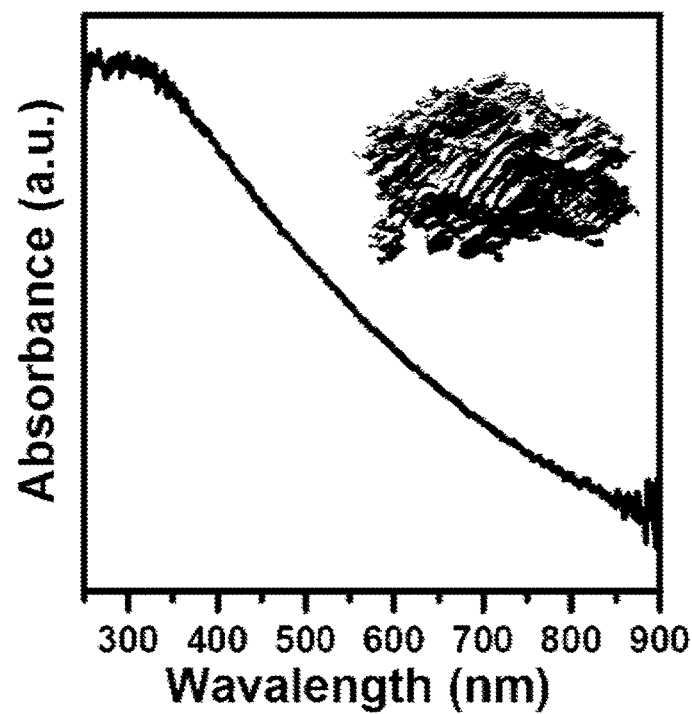

FIG. 8 shows the optical absorption spectrum of the nitrogen-doped graphene oxide-quantum dot aqueous solution. The inset of FIG. 8A shows that the nitrogen-doped graphene oxide-quantum dot exhibited a light yellow color in solution, proving the visible light-absorbing ability of the material. For comparison, we obtained the diffusion reflectance spectra of the nitrogen-doped graphene oxide-quantum dot powder (FIG. 8B). The inset shows the photograph of the nitrogen-doped graphene oxide-quantum dot powder, which exhibits a dark brown color. The nitrogen-doped graphene oxide-quantum dot solution had an absorption spectrum mostly in the visible light region, whereas the absorption of the nitrogen-doped graphene oxide-quantum dot powder extended to the near-infrared region. The aggregation of graphene sheets in the nitrogen-doped graphene oxide-quantum dot powder caused the red shift in absorption. Graphene-based molecules have a flat configuration, and the electrons of individual molecules can be delocalized all over the molecules to lower the band gap when the intermolecular separation is reduced. The band-gap calculation based on the absorption spectrum of the solution was more realistic because the nitrogen-doped graphene oxide-quantum dots were highly dispersed in the solution during the photocatalytic reaction.

Figure 9:
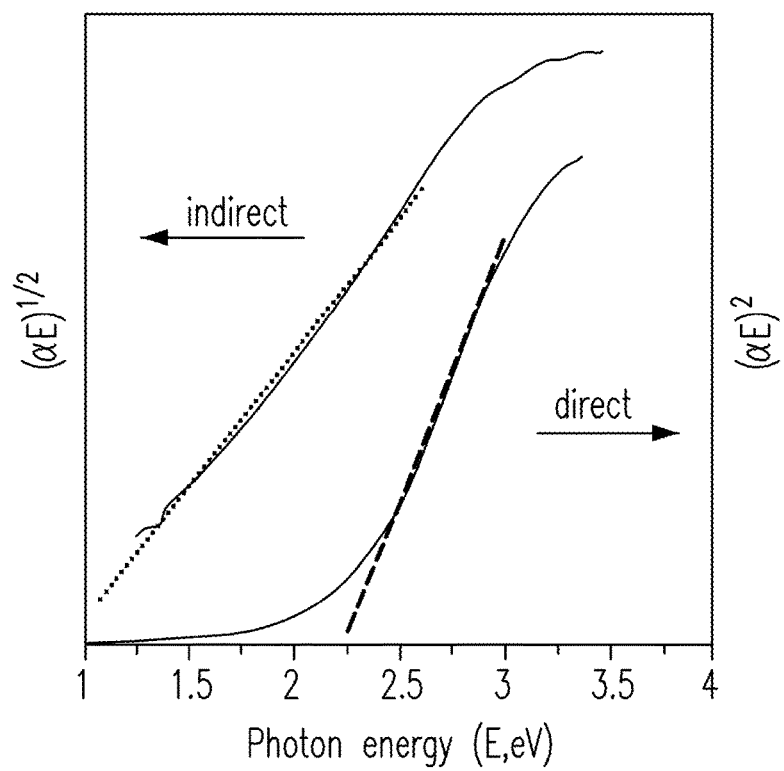
FIG. 9 shows the plots of $(\alpha E)^2$ and $(\alpha E)^{1/2}$ against photon energy (E) for the NGO-QDs solution, where $\alpha$ is the absorbance.

We plotted the square and square root of the absorption energy ($\alpha E$, where $\alpha$ is the absorbance) against the photon energy (E) to determine the energies of the direct and indirect gaps, respectively. The converted plots (FIG. 9) did not show a sharp absorption edge for specific gap energy. This occurred because the nitrogen-doped graphene oxide-quantum dot consisted of graphene quantum dot with various oxidation and nitridation levels. Particle size variation also contributed to the broadening of the absorption edge. Applying an approximate linear extrapolation, an apparent energy of 2.3 eV for direct transition and 0.9 eV for indirect transition was obtained for the nitrogen-doped graphene oxide-quantum dot (FIG. 9). Even though the gap energy was sufficiently large to overcome the energy required for the endothermic water-splitting reaction (1.23 eV, theoretically), a more critical question is whether the CBM and VBM energy levels are sufficient to provide overpotentials for $H_2$ and $O_2$ generation.

Figure 10A:
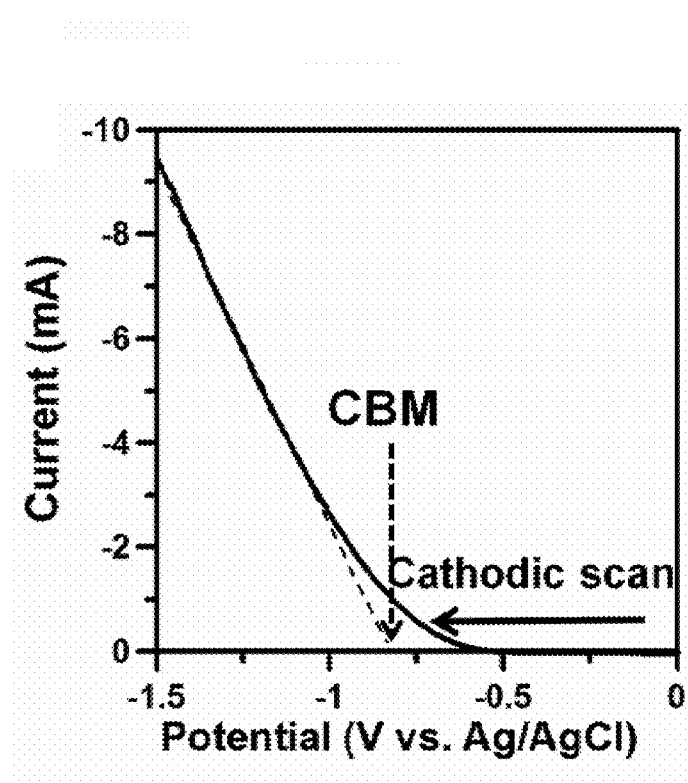
FIGS. 10A-10C show the CBM, VBM and capacitance.
Figure 10B:
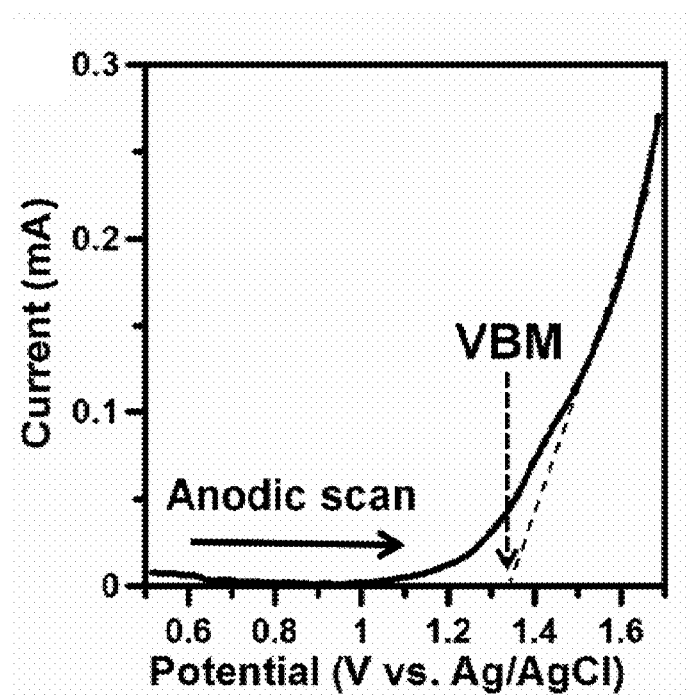

We analyzed the nitrogen-doped graphene oxide-quantum dot using linear potential scans to determine the CBM and VBM energy levels. Applying potentials above the CBM to form an accumulation layer, or below the VBM to form inversion layers, can lead to the abrupt emergence of cathodic and anodic currents, respectively. FIGS. 10 (A and B) shows the cathodic and anodic scan results, showing CBM and VBM values of approximately −0.85 and 1.35 eV (vs. Ag/AgCl), respectively. The band-gap energy determined from this potential scan was 2.2 eV, in agreement with that obtained from the optical absorption spectrum.

Figure 10C:
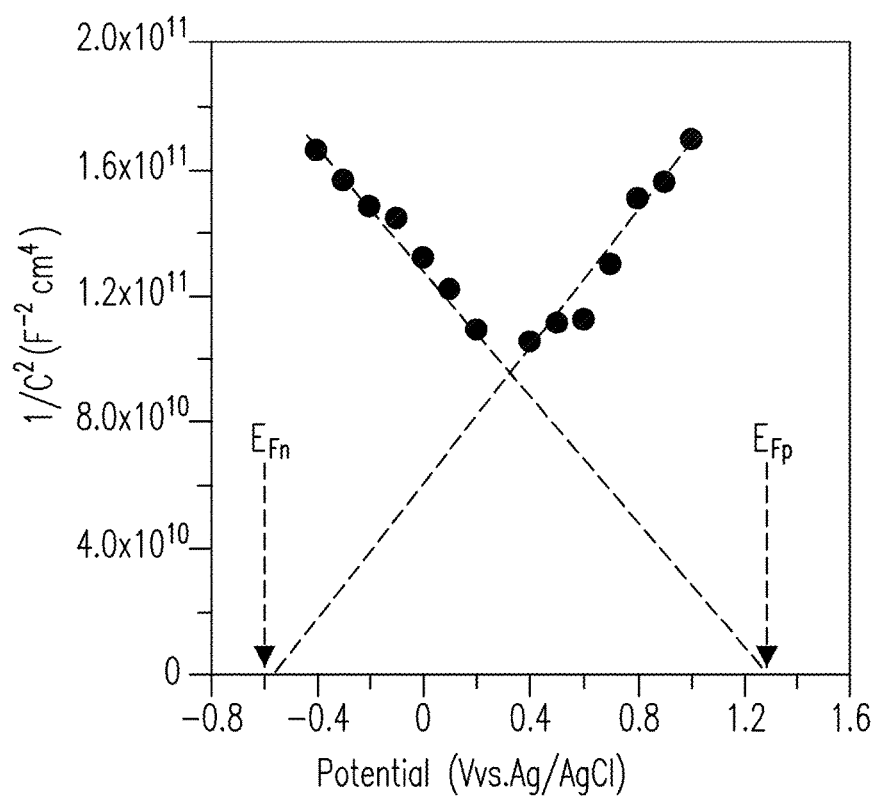
Figure 11:
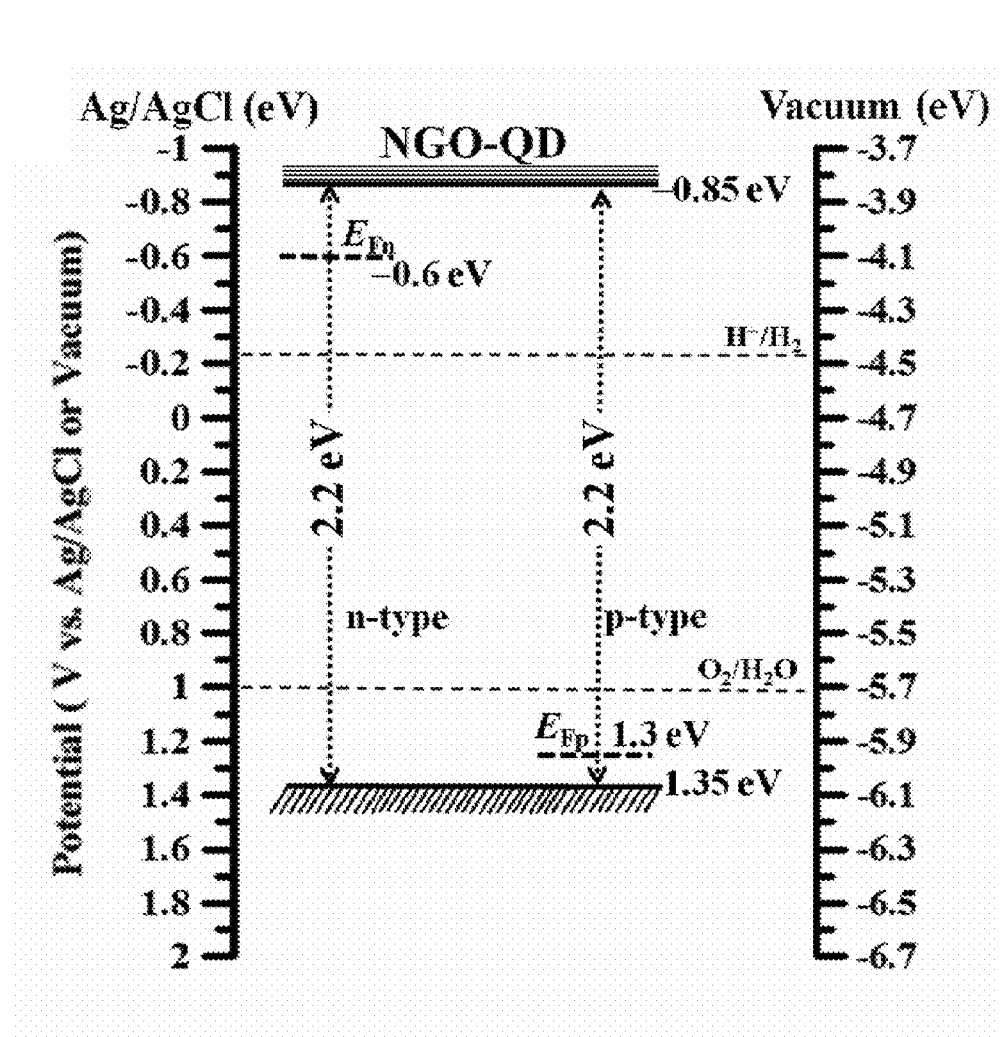
FIG. 11 shows the schematic energy level diagrams of NGO-QDs exhibiting p- and n-type conductivities in comparison with the potentials for water reduction and oxidation.

We conducted electrochemical impedance spectroscopic analyses, and used the Mott-Schottky equation to identify the type of conductivity of the nitrogen-doped graphene oxide-quantum dot. The capacitance was determined by electrochemical impedance spectroscopy. The symbols $E_{Fp}$ and $E_{Fn}$ represent the Fermi levels of the p- and n-type conductivity domains. FIG. 10C shows the capacitance values of the space charge region obtained at various applied potentials. By using to the Mott-Schottky equation, a linear relationship of $1/C^2$ versus applied potential can be calculated. FIG. 10C shows straight lines with negative and positive slopes located in different potential regimes. The negative and positive slopes correspond to p-type and n-type conductivities, respectively. The results indicate the co-existence of both p-type and n-type conductivities in the nitrogen-doped graphene oxide-quantum dot. The sequential nitrogen and oxygen introduction process successfully created n-type and p-type domains in the nitrogen-doped graphene oxide-quantum dot. The Fermi levels of the material were determined from the intercepts of the extrapolated straight lines on the abscissa. Based on the preceding data (FIG. 10A-10C), FIG. 11 shows the energy level diagrams of the nitrogen-doped graphene oxide-quantum dot with the presence of both n-type and p-type conductivities. The CBM and VBM are the apparent values of the entire quantum dot.

In graphene oxide materials, the CBM is mainly formed by the anti-bonding π* orbital, which has a higher energy level than that required for water reduction. The VBM is composed of hybridized π and O 2p orbitals, with its position depending on the oxidation level of the graphene sheets. The band gap between the CBM and VBM (2.2 eV in width) encompassed the energy levels for water reduction and oxidation, indicating the feasibility of using nitrogen-doped graphene oxide-quantum dot to catalyze overall water-splitting under visible-light irradiation.

Figure 12A:
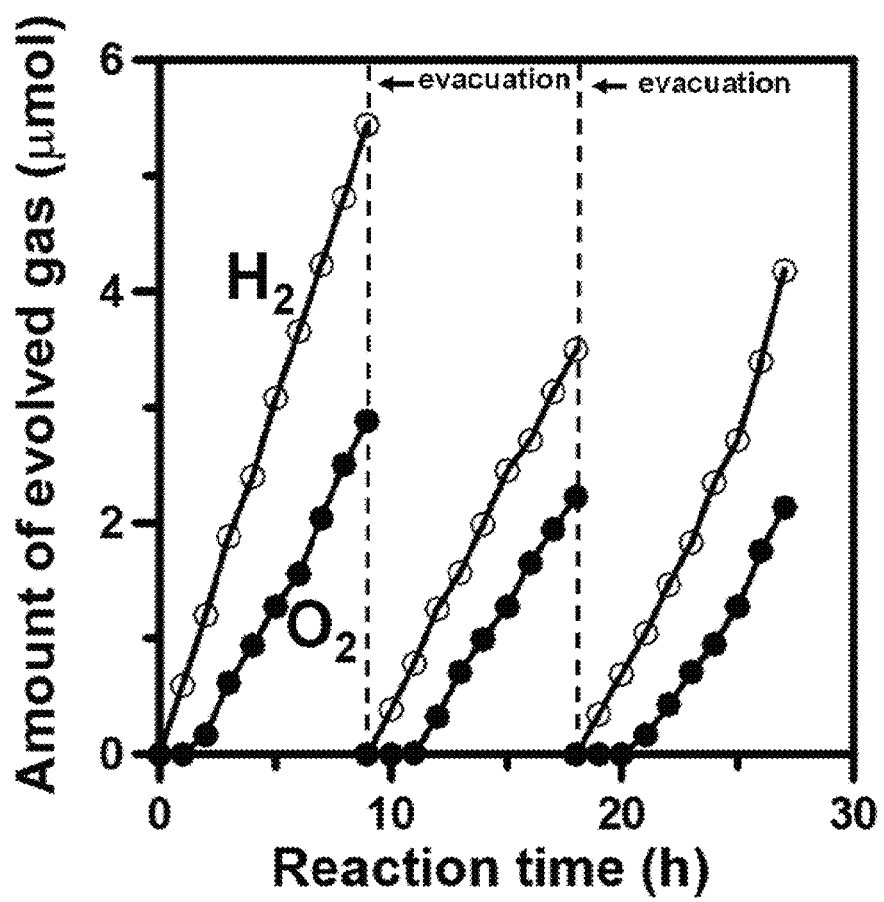
FIGS. 12A-12D show the results of photocatalytic reactions.
Figure 12B:
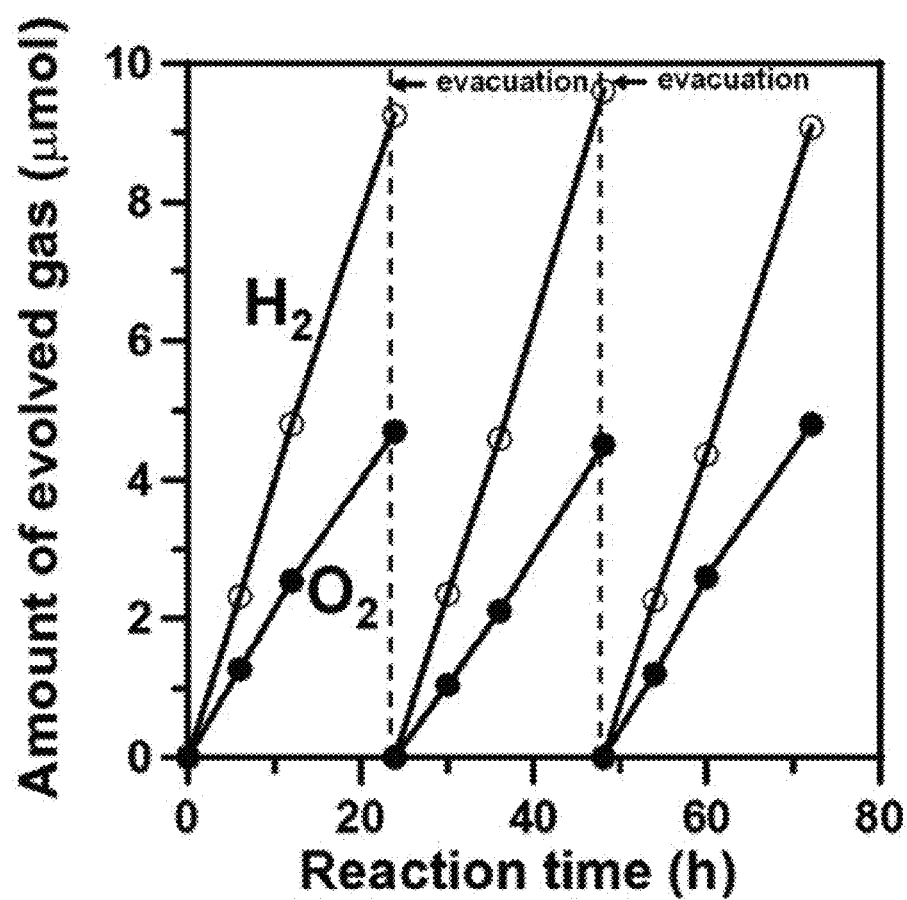
Figure 12C:
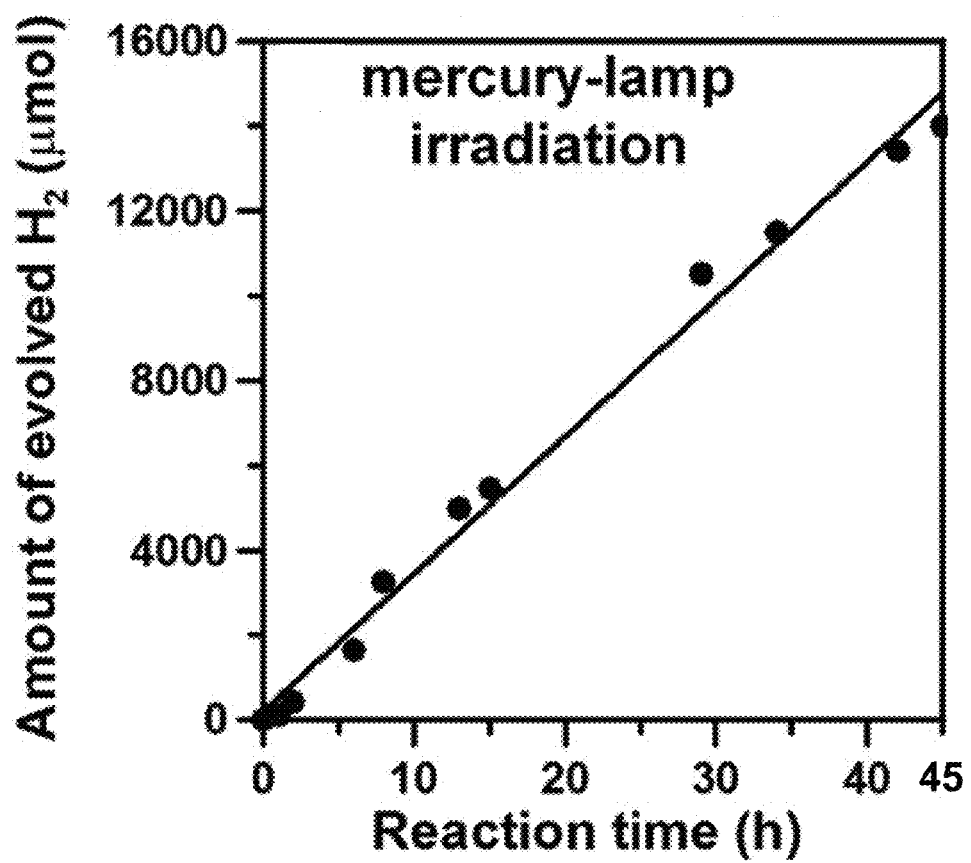
Figure 12D:
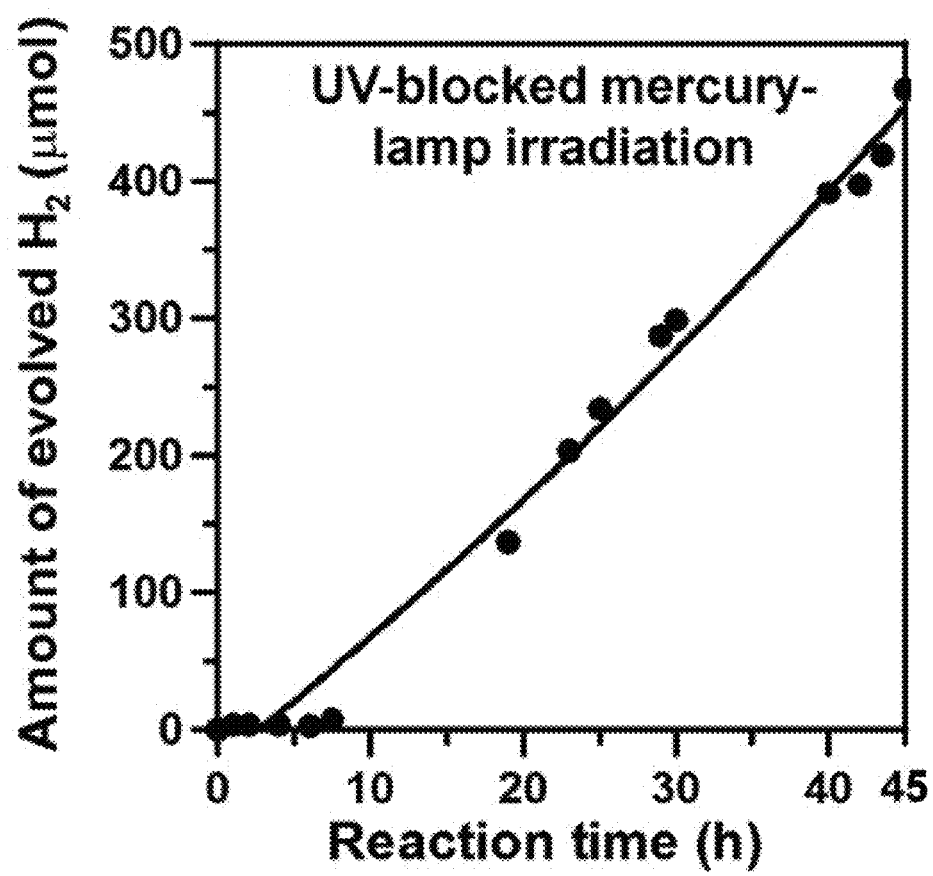

This invention used a gas-enclosed system with external visible light irradiation (420 nm<λ<800 nm) to analyze the photocatalytic performance of the nitrogen-doped graphene oxide-quantum dot for water decomposition. Pure water was the only reactant contained in the reaction vessel, and the nitrogen-doped graphene oxide-quantum dot contained no cocatalyst and were metal-free. FIG. 12A shows the time course for product generation over the nitrogen-doped graphene oxide-quantum dot catalyst for 27 h with intermediate system evacuation. Products ($H_2$ and $O_2$) were steadily generated from the system at an $H_2$:$O_2$ ratio of approximately 2:1. No $N_2$ generation was observed in this system. FIG. 12B-12D shows the results of photocatalytic reactions conducted for longer times and demonstrates the high stability of the nitrogen-doped graphene oxide-quantum dot. In FIG. 12B, a Xe-lamp combined with UV-cutoff and IR-cutoff filters served as the light source. The steady $H_2$ and $O_2$ generation from pure water in the stoichiometric ratio of 2:1 for 72 h has strongly demonstrates the capability and stability of nitrogen-doped graphene oxide-quantum dot in photocatalytic overall water-splitting. FIG. 12C shows the time course of $H_2$ generation from a 20 vol % aqueous methanol solution (900 mL) suspended with 0.3 g of nitrogen-doped graphene oxide-quantum dot under inner mercury lamp (UM452, Ushio, Japan) irradiation. The number of hydrogen atoms in the $H_2$ generation after 45 h was more than twice that of carbon atoms in the nitrogen-doped graphene oxide-quantum dot photocatalyst. This supports the conclusion that nitrogen-doped graphene oxide-quantum dot can steadily generate $H_2$ through a photocatalytic process, rather than self-decomposition. An auxiliary blank test shows that the amount of $H_2$ generated from a photocatalyst-free methanol solution (20 vol %) was negligibly small relative to that from the nitrogen-doped graphene oxide-quantum dot-containing system. FIG. 12D shows the time course of $H_2$ generation from a 20 vol % aqueous methanol solution (900 mL) suspended with 0.3 g of nitrogen-doped graphene oxide-quantum dot under inner irradiation with a UV-blocked mercury lamp (UM452, Ushio, Japan), in which a $NaNO_2$ aqueous solution (1 M) was used to filter out the UV light (λ<400 nm).

Figure 13:
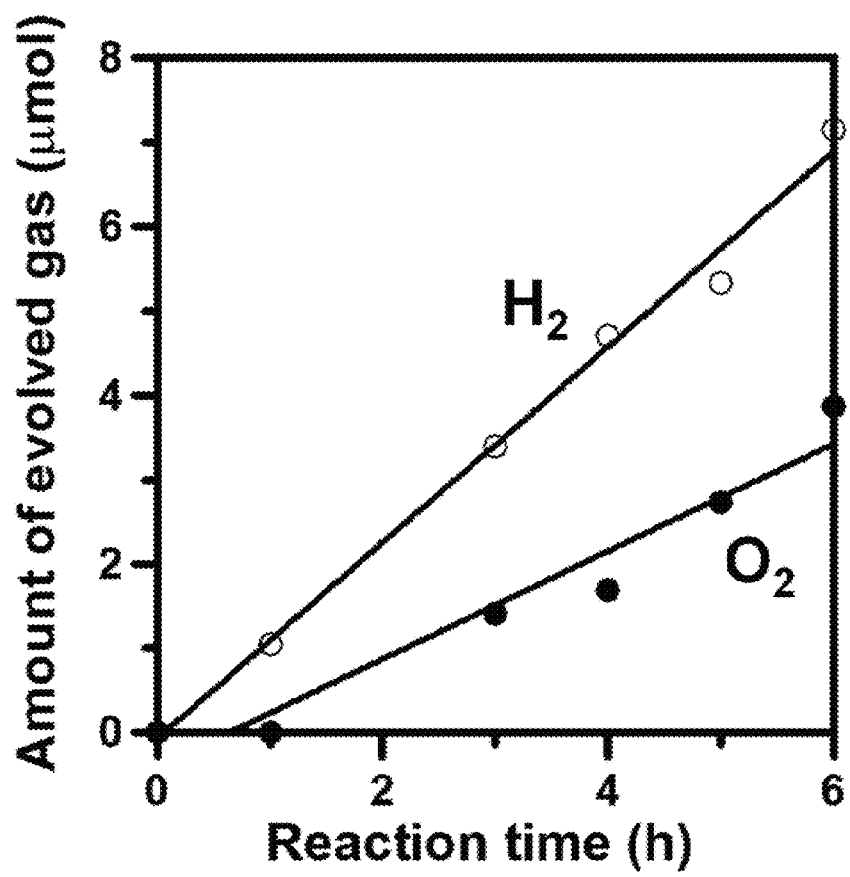
FIG. 13 shows the generation of $H_2$ and $O_2$ over 0.5 g of $Rh_{2-y}Cr_yO_3/GaN:ZnO$.

We also tested the well-characterized $Rh_{2-y}Cr_yO_3$/GaN:ZnO catalyst in the present reacting system to investigate the working characteristics and performance of the reactor. FIG. 13 shows the generation of $H_2$ and $O_2$ in a 2:1 ratio using the $Rh_{2-y}Cr_yO_3$/GaN:ZnO catalyst. The comparison shows that the water-splitting activity of the nitrogen-doped graphene oxide-quantum dot was about half that of the $Rh_{2-y}Cr_yO_3$/GaN:ZnO. Nevertheless, the nitrogen-doped graphene oxide-quantum dot catalyst is metal-free and only consists of the elements C, H, O, and N, whereas the $Rh_{2-y}Cr_yO_3$/GaN:ZnO contains various metals including the noble metal Rh. Thus, the nitrogen-doped graphene oxide-quantum dot catalyst is a more sustainable medium for $H_2$ production, from the environmental and economic points of view.

Figure 14:
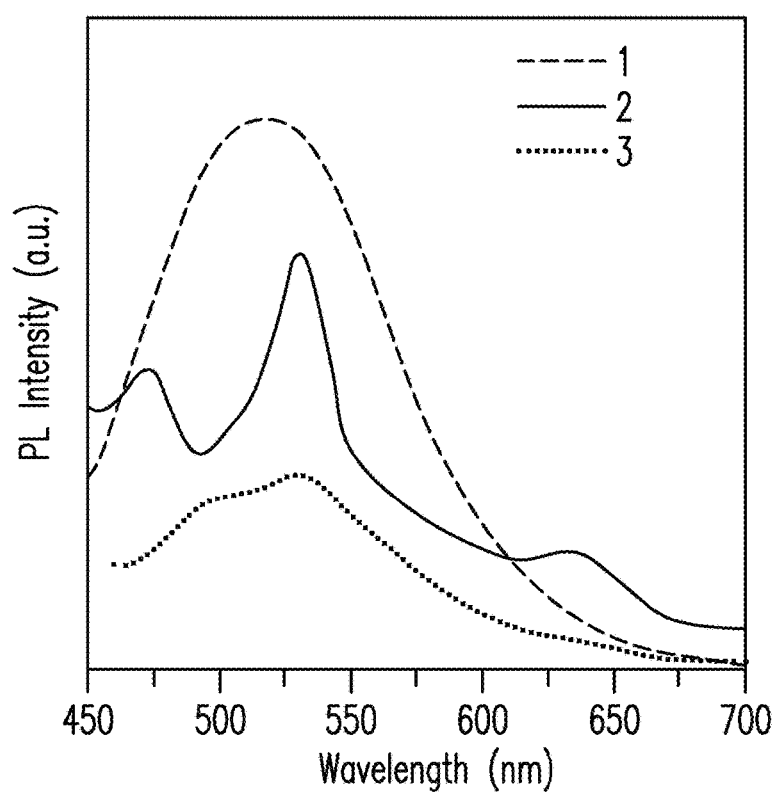
FIG. 14 shows the photoluminescence emission spectra of the NGO-QDs, $Rh_{2-y}Cr_yO_3/GaN:ZnO$, and GO-QDs aqueous suspensions subjected to a 420 nm excitation.

FIG. 14 shows the photoluminescence (PL) spectra of the nitrogen-doped graphene oxide-quantum dot and $Rh_{2-y}Cr_yO_3$/GaN:ZnO suspensions subjected to a 420 nm excitation. The nitrogen-doped graphene oxide-quantum dot suspension exhibited a strong photoluminescence emission peak at 520 nm, whereas the photoluminescence emission from the $Rh_{2-y}Cr_yO_3$/GaN:ZnO was weak (with a main peak at 530 nm). In addition, we synthesized a graphene oxide-quantum dot catalyst for the photoluminescence analysis. The graphene oxide-quantum dot catalyst was synthesized in the same manner as for the nitrogen-doped graphene oxide-quantum dot, except that the $NH_3$ treatment was replaced with an Ar treatment. This catalyst contained no nitrogen atoms and had p-type conductivity. The graphene oxide-quantum dot exhibited a much weaker photoluminescence emission than the nitrogen-doped graphene oxide-quantum dot (FIG. 14).

Figure 15:
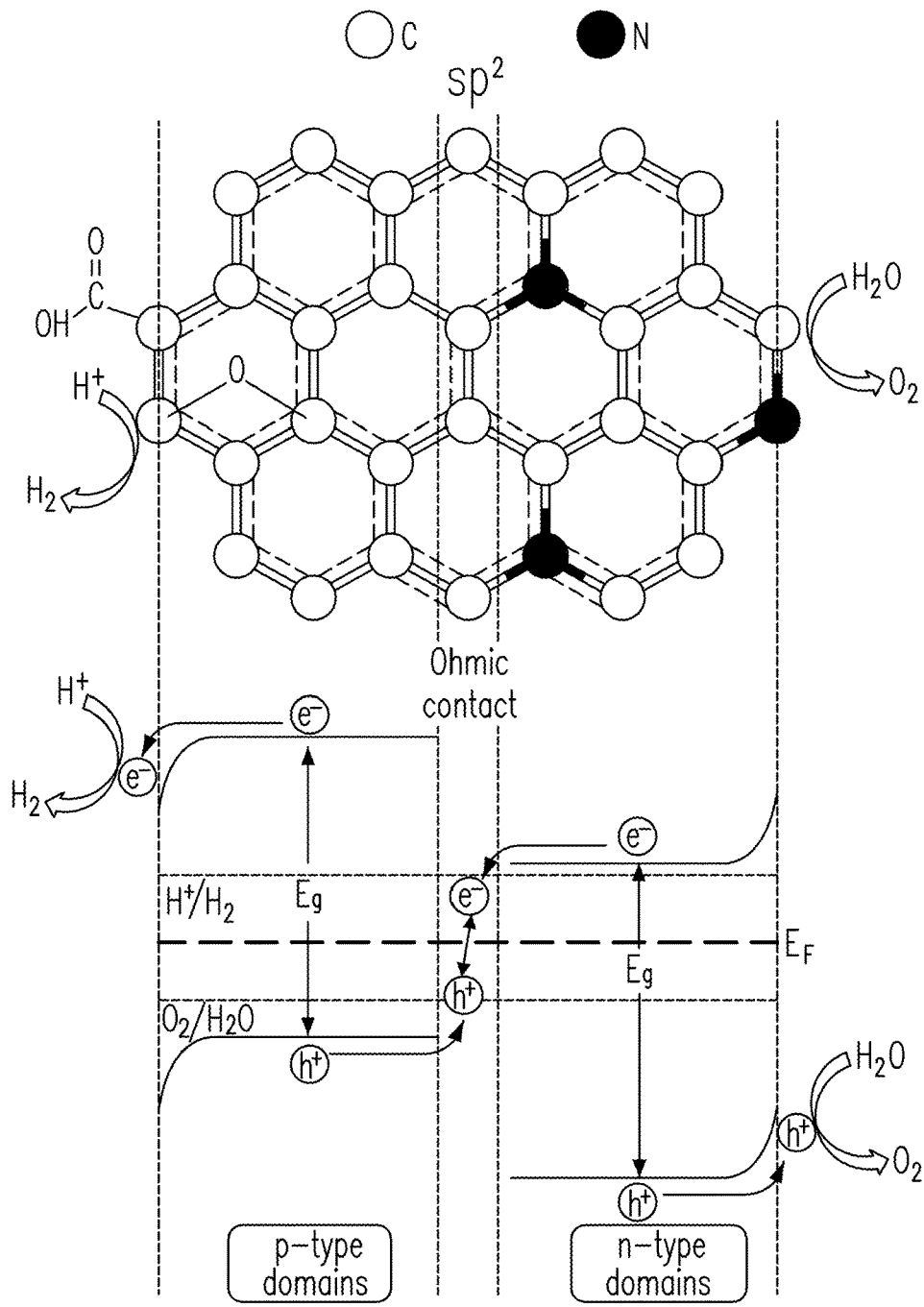
FIG. 15 shows the configuration and energy diagram for the NGO-QDs photochemical diode.

The stronger photoluminescence emission from the nitrogen-doped graphene oxide-quantum dot catalyst might be associated with the formation of p-n type photochemical diodes in the quantum dot. The electron-hole recombination in graphene oxide generally results from electronic transition among the $sp^2$ clusters and the boundary of oxidized regions; that is, the recombination occurs in the vicinity of the $sp^2$ clusters. The small $sp^2$ clusters of nitrogen-doped graphene oxide-quantum dot may serve as the interfacial junction between the p-type and n-type domains distributed in the quantum dot (FIG. 15). Illumination of the diode system results in the recombination of majority carriers in the $sp^2$ cluster, producing useful electron-hole pairs at the semiconductor-water interfaces. This two-photon absorption water-splitting reaction scheme bears a remarkable similarity to biological photosynthesis in the sense that the p-type and n-type domains in the nitrogen-doped graphene oxide-quantum dot are analogous to Photosystems I and II, respectively.

The diode consists of the p-type and n-type domains, connected through the $sp_2$ clusters as an ohmic contact. Illumination of the diode system results in recombination of majority carriers in the $sp^2$ clusters to produce useful electron-hole pairs at the semiconductor-water interfaces. The band bending of the p-type domains at the semiconductor-water interfaces is analogous to Photosystem I for electron injection to produce $H_2$. The band bending of the n-type domains at the semiconductor-water interfaces is analogous to Photosystem II for hole injection to produce $O_2$. This water-splitting reaction scheme for the graphene-based photocatalyst bears a remarkable similarity to biological photosynthesis.

Figure 16A:
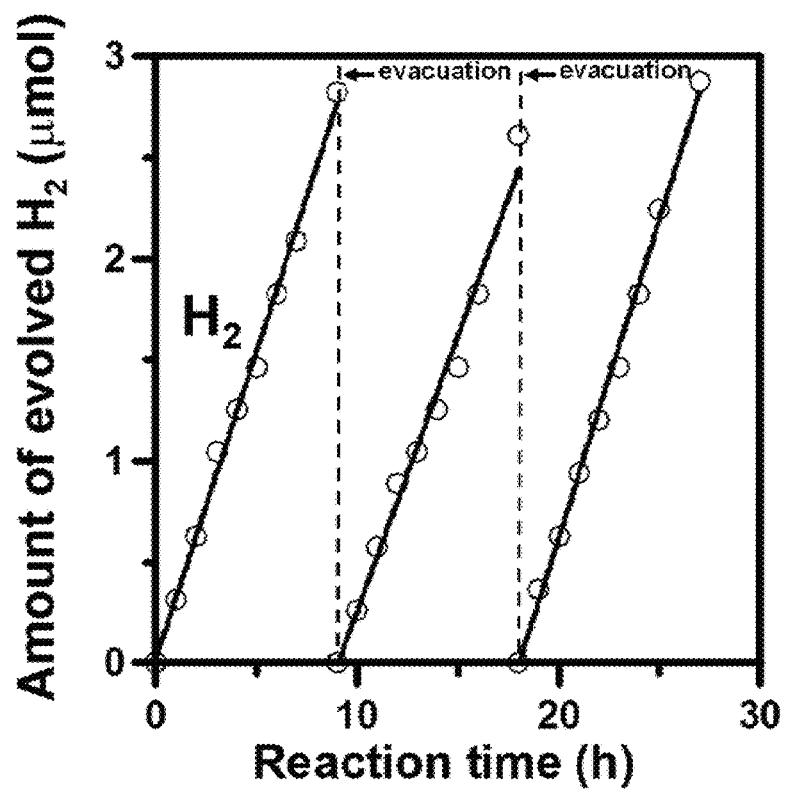
FIGS. 16A-16B show the generation of $H_2$ or $O_2$.
Figure 16B:
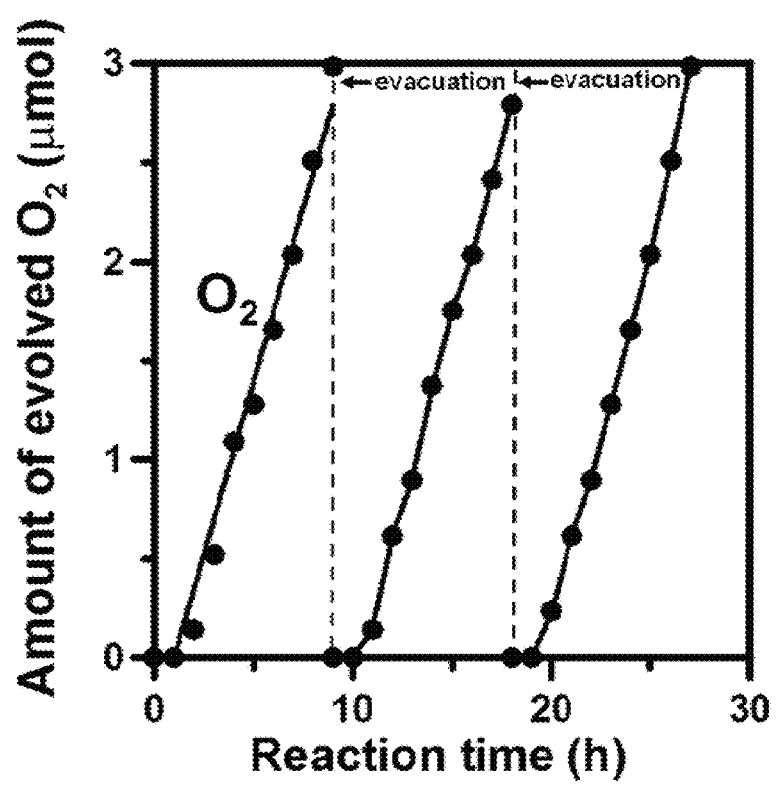

The energy levels outlined in FIG. 15 reveal that the photochemical diode configuration resulted in favorable band-bending situations for electron and hole injections from the p- and n-type domains, respectively. Nevertheless, band bending was incomplete because of the small size of the quantum dot. The simultaneous $H_2$ and $O_2$ generation over the nitrogen-doped graphene oxide-quantum dots, at the stoichiometric ratio, can be attributed to the formation of favorable bending in the diode system. To justify this argument, we used the p-type graphene oxide-quantum dot catalyst for photocatalytic water-splitting analysis in the same reaction system. FIG. 16A shows the time course for product generation of the graphene oxide-quantum dot catalyst. $H_2$ was steadily evolved from the reactor, but no $O_2$ generation was observed. We also modified nitrogen-doped graphene oxide-quantum dot with an $NH_3$ treatment to obtain n-type $NH_3$-nitrogen-doped graphene oxide-quantum dot for analysis. FIG. 16B shows that the $NH_3$-nitrogen-doped graphene oxide-quantum dot only catalyzed $O_2$ generation from photocatalytic water-splitting. The results of FIGS. 16A and 16B support our interpretation that the p-domains and n-domains were responsible for the generation of $H_2$ and $O_2$, respectively. An energetic band bending was present at the interface between semiconductor and solution, and a p-n type photochemical diode configuration (FIG. 15), mimicking the biological photosynthesis system, provided a favorable situation to accomplish vectorial charge displacement for overall water-splitting.

In summary, this invention demonstrated that nitrogen-doped graphene oxide-quantum dot derived from graphene oxide sheets were capable of catalyzing overall water-splitting under visible-light irradiation. The developed nitrogen-doped graphene oxide-quantum dot photocatalyst consisted of nitrogen-doped graphene sheets stacked into crystals, with oxygen functional groups on the crystal surface. The band gap of the nitrogen-doped graphene oxide-quantum dot was approximately 2.2 eV, and was capable of absorbing visible light to generate excitons. This nitrogen-doped graphene oxide-quantum dot construction resulted in the formation of p-n type photochemical diodes, in which the n-conductivity was caused by embedding nitrogen atoms in the graphene frame, and the p-conductivity by grafting oxygen functionalities on the graphene surface. Visible-light illumination of nitrogen-doped graphene oxide-quantum dot suspended in pure water resulted in the generation of $H_2$ and $O_2$ at a molar ratio of approximately 2:1. The p-domains and n-domains were responsible for the production of $H_2$ and $O_2$ gases, respectively. Nitrogen-free quantum dot with p-type conductivity catalyzed only $H_2$ generation under irradiation, proving that the band bending in the p-type domains was favorable for electron injection to produce $H_2$. Likewise, $NH_3$-treated nitrogen-doped graphene oxide-quantum dot showed n-type conductivity and catalyzed only $O_2$ generation.

The $sp^2$ clusters serve as the junction between the p-domains and n-domains and are the recombination sites for majority carriers from the two domains. The strong photoluminescence emission from the nitrogen-doped graphene oxide-quantum dot with visible-light irradiation might be associated with the presence of the interfacial junction for recombination. The photochemical diode-type mechanism for water-splitting of nitrogen-doped graphene oxide-quantum dot showed a remarkable similarity to that of biological photosynthesis. Nitrogen-doped graphene oxide-quantum dot are metal-free and consist of only C, H, O and N. This chemical composition implies that developing graphene-based photocatalysts makes photosynthetic $H_2$ generation from water-splitting achievable in a sustainable and environmentally-friendly way. The present invention discloses a strategy to design a semiconductor architecture on graphene to mimic the vectorial charge displacement in biological photosynthesis.

Experimental Methods

X-ray photoelectron spectroscopy (XPS; Kratos AXIS Ultra DLD, UK) with Al K. radiation was used to quantitatively analyze the chemical composition of the nitrogen-doped graphene oxide-quantum dots. High-resolution transmission electron microscopy (HRTEM; Jeol 2100F, Japan), equipped with a field-emission gun operating at 200 keV and a Gatan Enfina electron energy-loss spectroscopy (EELS) spectrometer, was used to explore the microstructure of the nitrogen-doped graphene oxide-quantum dots. The samples were deposited on carbon substrates for measurement. The thicknesses of nitrogen-doped graphene oxide-quantum dots were analyzed using EELS carried out with a dispersion of 1 eV per channel. We also analyzed the topography of the nitrogen-doped graphene oxide-quantum dots with atomic force microscopy (AFM; Nanoscope IIIa, Digital Instrument, USA) conducted in a tapping mode. The samples for AFM measurements were deposited on mica substrates. The optical absorption spectrum of a nitrogen-doped graphene oxide-quantum dot/water suspension was obtained by placing the solution in a 1-cm quartz cuvette and analyzed using a Hitachi U-4100 (Japan) spectrophotometer. The diffuse reflection spectrum of the nitrogen-doped graphene oxide-quantum dot powder was also measured and was converted from reflection to absorbance. The photoluminescence spectra of the nitrogen-doped graphene oxide-quantum dot and $Rh_{2-y}Cr_yO_3$/GaN:ZnO catalysts in water suspensions were measured at ambient temperature using a fluorescence spectrophotometer (Hitachi F-700, Japan).

Quantum dot electrodes for electrochemical analysis were prepared by drop-casting quantum dot/water suspensions onto a screen-printed carbon electrode (Zensor R&D Co., USA). We subjected the quantum dot electrodes to electrochemical analysis in a 0.5 M $Na_2SO_4$ solution with a Pt foil counter and an Ag/AgCl reference. The conductivity type of the quantum dot electrodes was analyzed through impedance spectroscopy (Zahner IM6e, Germany) equipped with Thales software. The measurements applied a sinusoidal potential perturbation with a small amplitude (10 mV), superimposed on a fixed DC potential varying within a potential window from −0.4 to 1 V (vs. Ag/AgCl). In the same electrochemical system, a linear potential scan (5 mV/s) was conducted to determine the CBM and VBM of the nitrogen-doped graphene oxide-quantum dot specimen.

GaN:ZnO Catalyst and $Ga_2O_3$ Component

For the purpose of photocatalytic activity comparison, this study synthesized the well-explored GaN:ZnO catalyst for overall water-splitting tests. A GaN:ZnO catalyst was prepared by nitridation of a $Ga_2O_3$—ZnO mixture with $NH_3$. The $Ga_2O_3$ component was obtained from calcination (1000° C. for 6 h) of a crystalline $Ga(OH)_3$ powder, which was derived from autoclaving an aqueous solution of gallium nitrate (Alfa Aesar, USA) and ammonium hydroxide ($NH_4OH$, 25 vol %, Sigma Aldrich, Germany) at 120° C. for 6 h.

Photocatalytic Reactions

Photocatalytic reactions were conducted at approximately 25° C. in a gas-enclosed side irradiation system.

We suspended the quantum dot catalysts (1.2 g) in 200 mL of pure water (pH=3) in a Pyrex vessel with side irradiation from a 300 W Xenon lamp (Oriel Instruments, model 66901, USA). The incident light wavelength was limited to 420-800 nm by using a UV-cutoff filter (Oriel Instruments, 59480, USA) and an IR-cutoff filter (Oriel Instruments, 59044, USA). The amounts of generated hydrogen gas ($H_2$) and oxygen gas ($O_2$) were determined using gas chromatography (Hewlett-Packard 7890, USA; molecular sieve 5 A column, thermal conductivity detector, argon carrier gas).

Example 1: Preparation of Graphene Oxide

The graphite powder (5 g) and $NaNO_3$ (2.5 g; Merck, Germany) were introduced to a solution of concentrated $H_2SO_4$ (18M, 115 mL) in an ice bath. $KMnO_4$ (15 g) was gradually added with stirring; therefore, the temperature of the mixture remained below 20° C.

The mixture was stirred at 35° C. for 4 h to allow oxidation. Thereafter, deionized water (230 mL) was slowly added to the mixture and stirred at 98° C. for 15 min. The mixture was further diluted to 700 mL and stirred for 30 min. The reaction was concluded by adding $H_2O_2$ (12 mL, 35 wt %; Shimakyu, Japan) while stirring at room temperature.

Multiple washings were conducted with deionized water (3×500 mL), and the precipitate of the final slurry was dried at 40° C. for 24 h to obtain the graphene oxide specimens.

Example 2: Preparation of Nitrogen-Doped Oxide Graphene

Nitrogen-doped graphene synthesized by treating the as-prepared graphene oxide in a flow of $NH_3$ gas with temperatures in the range of 100-900° C. for 3 h.

Example 3: Preparation of Nitrogen-Doped Graphene Oxide-Quantum Dot

We synthesized nitrogen-doped graphene by treating the as-prepared graphene oxide in a flow of $NH_3$ gas at 500° C. for 3 h. The nitrogen-doped graphene oxide-quantum dots were obtained by oxidizing the synthesized nitrogen-doped graphene using the modified Hummers' method described above, followed by centrifugation to remove larger particles. Multiple washings of nitrogen-doped graphene oxide-quantum dots were conducted with ethanol and centrifugation was used to collect the specimens. In addition to nitrogen-doped graphene oxide-quantum dot, nitrogen-free graphene oxide-quantum dots were synthesized in the same manner as that for nitrogen-doped graphene oxide-quantum dot except that the $NH_3$ treatment was replaced with an Ar treatment.

Example 4: Preparation of Nitrogen-Doped Graphene Oxide-Quantum Dot

The nitrogen-doped graphene oxide-quantum dots were synthesized using $NH_3$ through treatment at 25° C. for 12 h to obtain $NH_3$-nitrogen-doped graphene oxide-quantum dot.

Example 5: Preparation of Nitrogen-Doped Graphene Oxide-Quantum Dot

The graphene oxide (0.3 g) and $NaNO_3$ (0.25 g) were introduced to a solution of concentrated $H_2SO_4$ (18M, 15 mL) in an ice bath. $KMnO_4$ (1.5 g) was gradually added with stirring; therefore, the temperature of the mixture remained below 20° C. The mixture was stirred at 35° C. for 12 h to allow oxidation. Thereafter, deionized water (50 mL) was slowly added to the mixture and stirred at 98° C. for 15 min.

The reaction was concluded by adding $H_2O_2$ (3 mL, 35 wt %) while stirring at room temperature. Multiple washings of nitrogen-doped graphene oxide-quantum dots were conducted with ethanol and centrifugation was used to collect the specimens.

Example 6: Preparation of Nitrogen-Doped Graphene Oxide-Quantum Dot from Nitrogen-Doped Graphene Oxide The nitrogen-doped graphene oxide was synthesized by directly annealing as-prepared graphene oxide in flowing $NH_3$ at 500° C. for 3 h. The nitrogen-doped graphene oxide was oxidized in concentrated $HNO_3$ at room temperature for 12 h. Then the solution was subsequently treated ultrasonically for 10 h using an ultrasonic instrument.

The mixture was calcined in a furnace installed with exhaust gas recovery at 140° C. for 12 h to remove the concentrated $HNO_3$ (boiling point 83° C.). The as-prepared products were dispersed in water (40 ml). Then the resulting black suspension was filtered through a 0.22 μm microporous membrane and centrifuged at 10,000 rpm to obtain a brown filter solution.

Example 7: Preparation of Boron-Doped Graphene Oxide-Quantum Dot from Boron-Doped Graphene Oxide The boron-doped graphene oxide was synthesized by dissolving boron oxide powders in an ethanol solution, and then the as-prepared graphene oxide was added to the solution. The mixture via drying at 80° C. for 12 h was heated in a flow of Ar gas at 500° C. for 3 h. The boron-doped graphene oxide was oxidized using concentrated $HNO_3$ at room temperature for 12 h. Then the solution was subsequently treated ultrasonically for 10 h using an ultrasonic instrument. The mixture was calcined in a furnace installed with exhaust gas recovery at 140° C. for 12 h to remove the concentrated $HNO_3$ (boiling point 83° C.). The as-prepared products were dispersed in water (40 ml). Then the resulting black suspension was filtered through a 0.22 μm microporous membrane and centrifuge at 10000 rpm to obtain a brown filter solution.

Embodiments

1. An photooxidative method for purifying waste water, comprises providing a compound having properties of a p-type semiconductor and an n-type semiconductor, obtaining a mixture by adding the compound to the waste water, and illuminating the mixture using a light source to excite the compound.

2. The photooxidative method of Embodiment 1, wherein the light source has an excitation wavelength ranging from 200 nm to 900 nm.

3. The photooxidative method of any one of Embodiments 1-2, wherein the compound has a quantum dot selected from a group consisting of a doped graphene oxide-quantum dot, a graphene oxide-quantum dot and a combination thereof.

4. The photooxidative method of any one of Embodiments 1-3, wherein the doped graphene oxide-quantum dot has at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—), and a combination thereof.

5. The photooxidative method of any one of Embodiments 1-4, wherein the doped graphene oxide-quantum dot has a carbon cluster serving as an interfacial junction.

6. The photooxidative method of any one of Embodiments 1-5, wherein the doped graphene oxide-quantum dot is embedded with the nitrogen atom, and grafted with the oxygen atom.

7. The photooxidative method of any one of Embodiments 1-6, wherein the doped graphene oxide-quantum dot has a particle size ranging from 6 nm to 10 nm, and a height ranging from 1 nm to 3 nm.

8. The photooxidative method of any one of Embodiments 1-7, wherein the graphene oxide-quantum dot has a band gap ranging from 0 to 7 eV.

9. The photooxidative method of any one of Embodiments 1-8, wherein the waste water includes an organic material and an inorganic material.

10. A photocatalytic composite comprises a compound having properties of a p-type semiconductor and an n-type semiconductor.

11. The photocatalytic composite of Embodiment 10, wherein the compound has a quantum dot selected from a group consisting of a doped graphene oxide-quantum dot, a graphene oxide-quantum dot and a combination thereof.

12. The photocatalytic composite of any one of Embodiments 10-11, wherein the doped graphene oxide-quantum dot has at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—), and a combination thereof.

13. The photocatalytic composite of any one of Embodiments 10-12, wherein the doped graphene oxide-quantum dot has a carbon cluster serving as an interfacial junction.

14. The photocatalytic composite of any one of Embodiments 10-13, wherein the doped graphene oxide-quantum dot is embedded with the nitrogen atom, and grafted with the oxygen atom. wherein the doped graphene oxide-quantum dot is embedded with the nitrogen atom, and grafted with the oxygen atom on a surface of the doped graphene oxide-quantum dot.

15. The photocatalytic composite of any one of Embodiments 10-14, wherein the doped graphene oxide-quantum dot has a particle size ranging from 6 nm to 10 nm, and a height ranging from 1 nm to 3 nm.

16. The photocatalytic composite of any one of Embodiments 10-15, wherein the graphene oxide-quantum dot has a band gap ranging from 0 to 7 eV.

17. A photocatalytic method for $H_2$ or $O_2$ generation from water, comprises amount of a composite providing a compound having properties of a p-type semiconductor and an n-type semiconductor of Embodiment 10, obtaining a mixture by adding the compound to the waste water, and illuminating the mixture using a light source to excite the compound.

18. The photocatalytic method of Embodiment 17, wherein the light source has an excitation wavelength ranging from 200 nm to 900 nm.

19. The photocatalytic method of any one of Embodiments 17-18, wherein the photocatalytic method is similar to biological photosynthesis 20. The photocatalytic method of any one of Embodiments 17-19, wherein the compound has a quantum dot selected from a group consisting of a doped graphene oxide-quantum dot, a graphene oxide-quantum dot and a combination thereof.

21. A luminescent composite comprises a compound having properties of a p-type semiconductor and an n-type semiconductor, obtaining a mixture by adding the compound to the waste water, and illuminating the mixture using a light source to excite the compound.

22. The luminescent composite of Embodiment 21, wherein the compound has a quantum dot selected from a group consisting of a doped graphene oxide-quantum dot, a graphene oxide-quantum dot and a combination thereof.

23. The luminescent composite of any one of Embodiments 21-22, wherein the doped graphene oxide-quantum dot has at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—), and a combination thereof.

24. The luminescent composite of any one of Embodiments 21-23, wherein the doped graphene oxide-quantum dot has a carbon cluster serving as an interfacial junction.

25. The luminescent composite of any one of Embodiments 21-24, wherein the doped graphene oxide-quantum dot has a particle size ranging from 6 nm to 10 nm, and a height ranging from 1 nm to 3 nm.

26. The luminescent composite of any one of Embodiments 21-25, wherein the graphene oxide-quantum dot has a band gap ranging from 0 to 7 eV.

27. A oxidative method for hydrogen gas ($H_2$) or oxygen gas ($O_2$) generation from water, comprises amount of a composite providing a compound having properties of a p-type semiconductor and an n-type semiconductor, obtaining a mixture by adding the compound to the water, and illuminating the mixture using a light source to excite the compound of Embodiment 21.

REFERENCE

T. Ohno, L. Bai, T. Hisatomi, K. Maeda, K. Domen *J. Am. Chem. Soc.* 2012, 134, 8254

What is claimed is:

1. An oxidative/reductive method for water, comprising:
   providing a graphene particle having a p-type conductivity domain and an n-type conductivity domain, wherein the graphene particle contains graphene oxide;
   obtaining a mixture by adding the graphene particle to the water; and
   illuminating the mixture by using a light source, wherein the graphene particle is excited by the light source, and the water is decomposed by the graphene oxide to generate hydrogen gas or oxygen gas.

2. The oxidative/reductive method as claimed in claim 1, wherein the light source has an excitation wavelength ranging from 200 nm to 900 nm.

3. The oxidative/reductive method as claimed in claim 1, wherein the water includes an organic material and an inorganic material.

4. The oxidative/reductive method as claimed in claim 1, wherein the graphene particle is a doped graphene oxide.

5. The oxidative/reductive method as claimed in claim 4, wherein the doped graphene oxide is a nitrogen-doped graphene oxide having at least a functional group selected from a group consisting of an amino group ($NH_2$—), a boron atom (B—), a hydrogen atom (H—), a hydroxyl group (—OH), a nitrogen atom (N—), an oxygen atom (O—), a phosphorus atom (P—) and a combination thereof.

6. The oxidative/reductive method as claimed in claim 4, wherein the doped graphene oxide is embedded with a nitrogen atom, and grafted with an oxygen atom on a surface of the graphene.

7. The oxidative/reductive method as claimed in claim 4, wherein the doped graphene oxide has a particle size ranging from 6 nm to 10 nm, and a height ranging from 1 nm to 3 nm.

8. The oxidative/reductive method as claimed in claim 1, wherein the graphene particle further has a carbon cluster serving as an interfacial junction between the p-type and n-type conductivity domains.

* * * * *